(12) United States Patent
Crouse et al.

(10) Patent No.: US 12,481,094 B2
(45) Date of Patent: Nov. 25, 2025

(54) FILTERS WITH REDUCED ANGLE-OF-INCIDENCE DEPENDENCE

(71) Applicant: Phoebus Optoelectronics LLC, Ithaca, NY (US)

(72) Inventors: David Thomas Crouse, Canton, NY (US); Igor Bendoym, Brooklyn, NY (US); Lori Ann Lepak, Ithaca, NY (US)

(73) Assignee: PHOEBUS OPTOELECTRONICS LLC, Ithaca, NY (US)

( * ) Notice: Subject to any disclaimer, the term of this patent is extended or adjusted under 35 U.S.C. 154(b) by 686 days.

(21) Appl. No.: 17/958,703

(22) Filed: Oct. 3, 2022

(65) Prior Publication Data
US 2023/0106382 A1    Apr. 6, 2023

Related U.S. Application Data

(60) Provisional application No. 63/251,884, filed on Oct. 4, 2021.

(51) Int. Cl.
*G02B 5/26* (2006.01)
*G02B 5/20* (2006.01)

(52) U.S. Cl.
CPC ............... *G02B 5/26* (2013.01); *G02B 5/201* (2013.01); *G02B 5/208* (2013.01)

(58) Field of Classification Search
CPC .......... G02B 5/26; G02B 5/201; G02B 5/208; G02B 1/002; G02B 5/20
See application file for complete search history.

(56) References Cited

U.S. PATENT DOCUMENTS

| 6,614,575 B1 * | 9/2003 | Gruning | G02B 6/1225 |
| | | | 257/466 |
| 2004/0004779 A1 * | 1/2004 | Kochergin | G03F 7/70958 |
| | | | 359/885 |

(Continued)

FOREIGN PATENT DOCUMENTS

WO    2020208610 A    10/2020

OTHER PUBLICATIONS

Fourouzmand, A., Mosallaei, H.; A Tunable Semiconductor-Based Transmissive Metasurface: Dynamic Phase Control with High Transmission Level; Laser & Photonics Reviews; May 14, 2020; vol. 14, Issue 6.

(Continued)

*Primary Examiner* — Balram T Parbadia
(74) *Attorney, Agent, or Firm* — BKDowd Law, P.C.; Betsy Kingsbury Dowd

(57) ABSTRACT

A device, or a pixel of a device, for filtering of incident radiation includes an array of discrete micro-resonant elements in an encapsulated layer, the encapsulating material having a lower index of refraction than the micro-resonant elements. A highly reflective filtering structure is positioned a first distance above the encapsulated layer and/or a second distance below the encapsulated layer, and is characterized by a stopband. The array of discrete micro-resonant elements is configured to transmit a passband of incident radiation centered around a center wavelength that falls within the stopband of the highly reflective filtering structure, and to minimize a dependence of the center wavelength on an angle of incidence (AoI) of the incident radiation. A pixelated device includes a plurality of pixels, each having an array of the discrete micro-resonant elements tuned to transmit a different passband having a different center wavelength, while minimizing dependence on AoI.

23 Claims, 22 Drawing Sheets

(56) References Cited

U.S. PATENT DOCUMENTS

| | | | |
|---|---|---|---|
| 2015/0124306 A1 | 5/2015 | Bartoli et al. | |
| 2017/0248739 A1* | 8/2017 | Matsuo | G02B 5/208 |
| 2019/0339431 A1* | 11/2019 | Wheatley | G01J 3/0229 |
| 2019/0346600 A1* | 11/2019 | Wheatley | G02B 5/201 |
| 2020/0201111 A1 | 6/2020 | Williams et al. | |
| 2022/0196897 A1* | 6/2022 | DeCorby | G02B 27/30 |
| 2024/0006441 A1* | 1/2024 | Miyata | H10F 39/8053 |

OTHER PUBLICATIONS

Horie, Y., et. al.; Wide bandwidth and high resolution planar filter array based on DBR-metasurface-DBR structures; Optics Express; May 19, 2016; vol. 24, No. 11.
International Search Report and Written Opinion of corresponding International Application No. PCT/US 22/45546; Jan. 24, 2023.

* cited by examiner

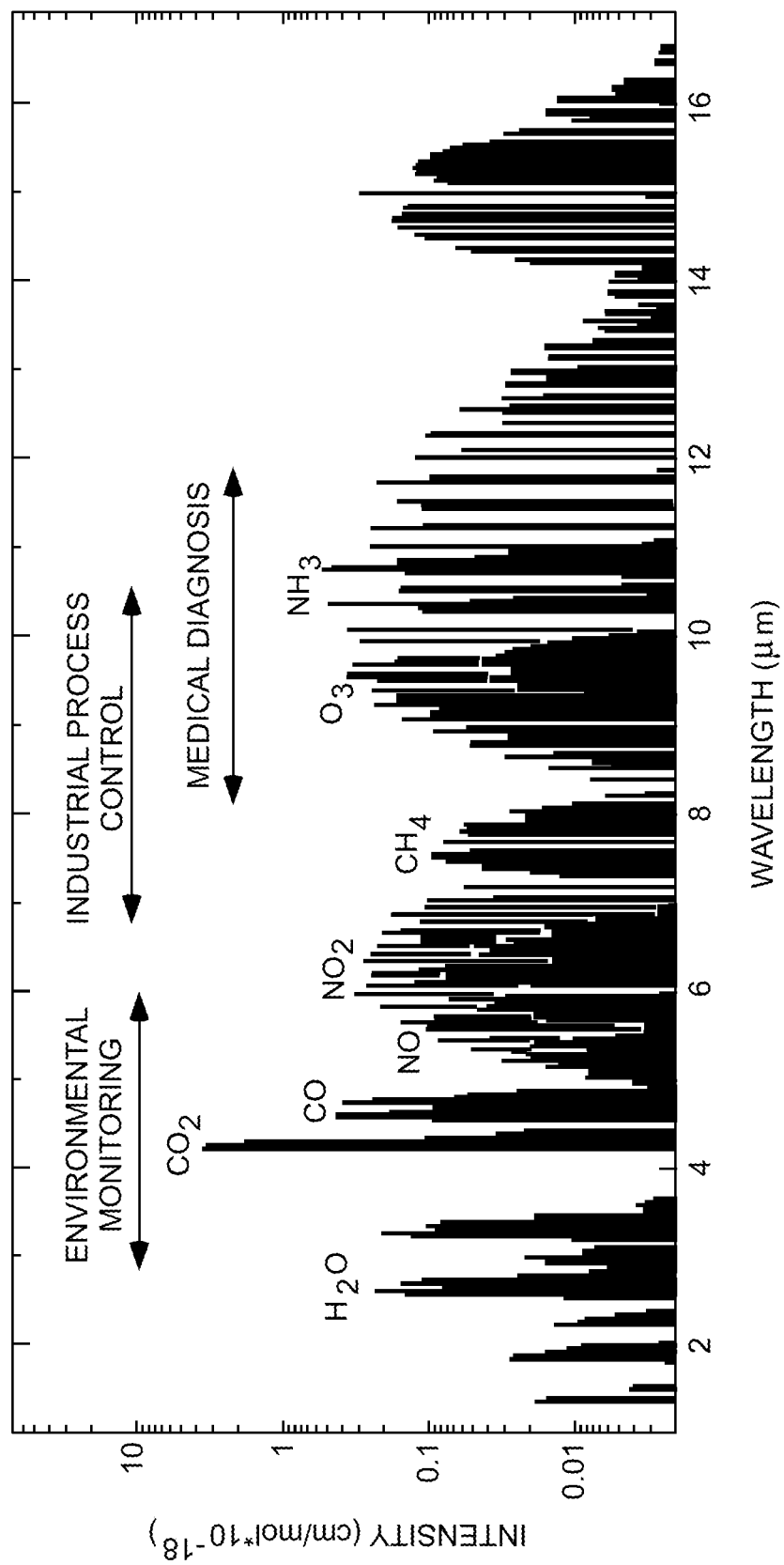

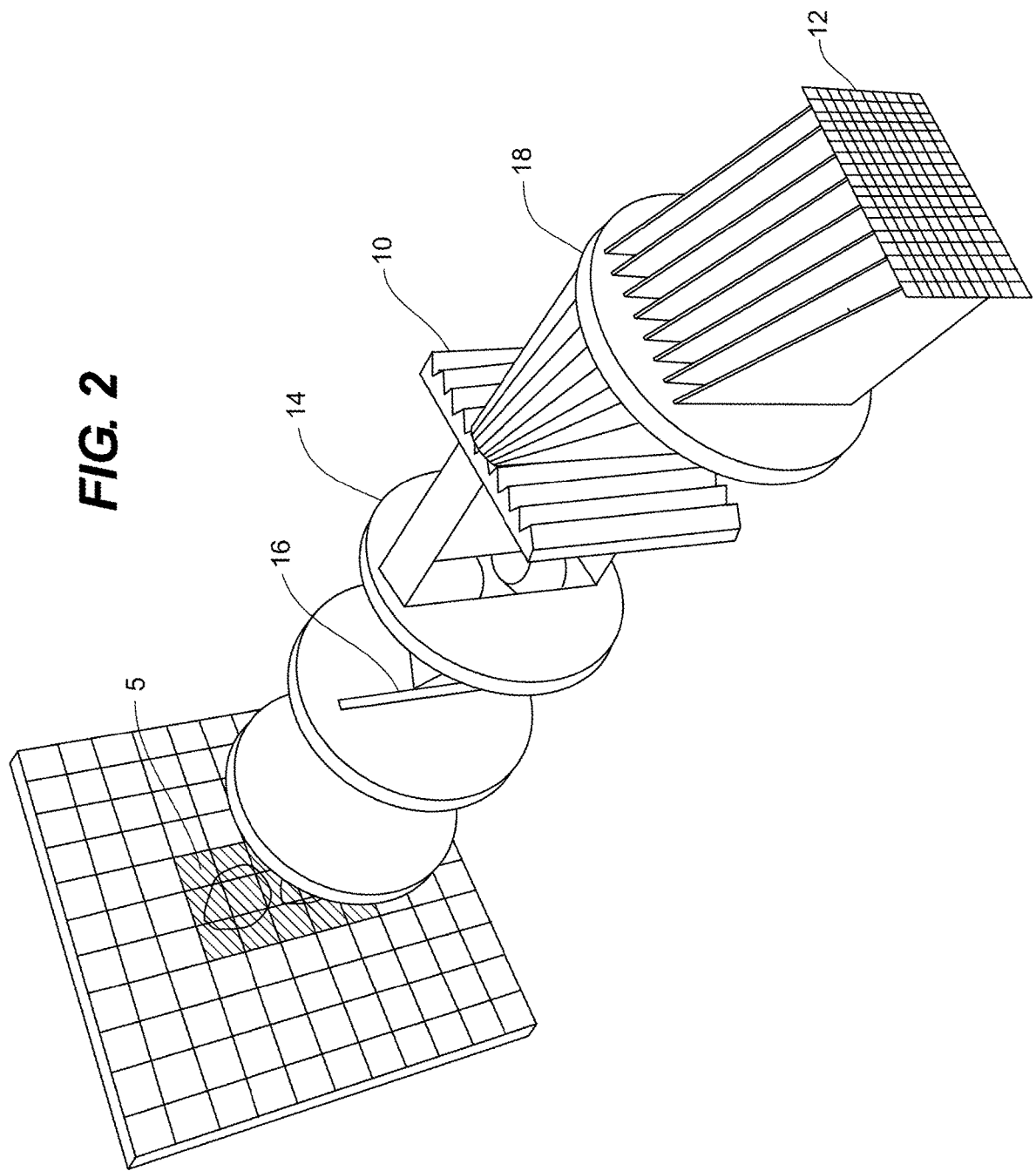

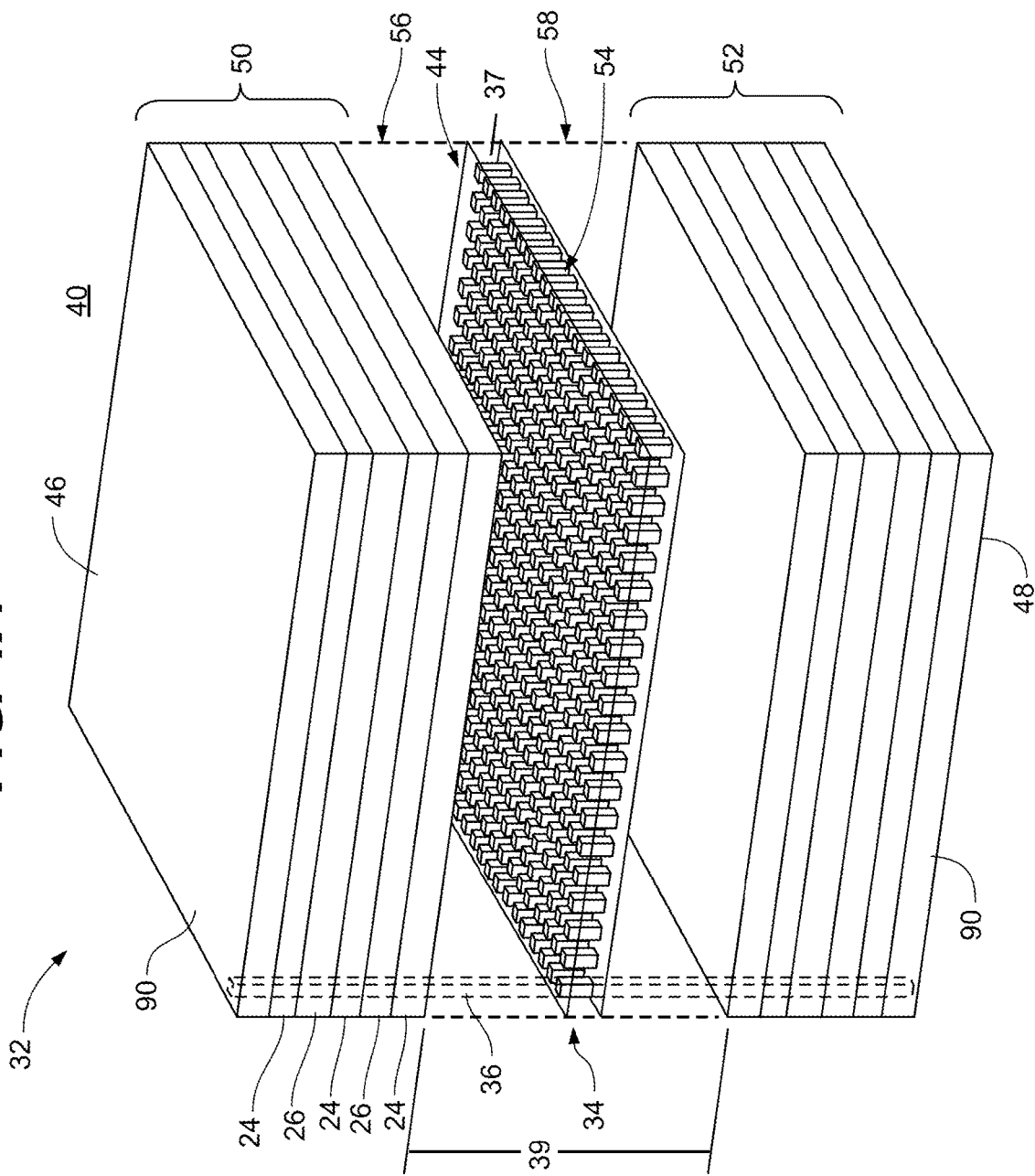

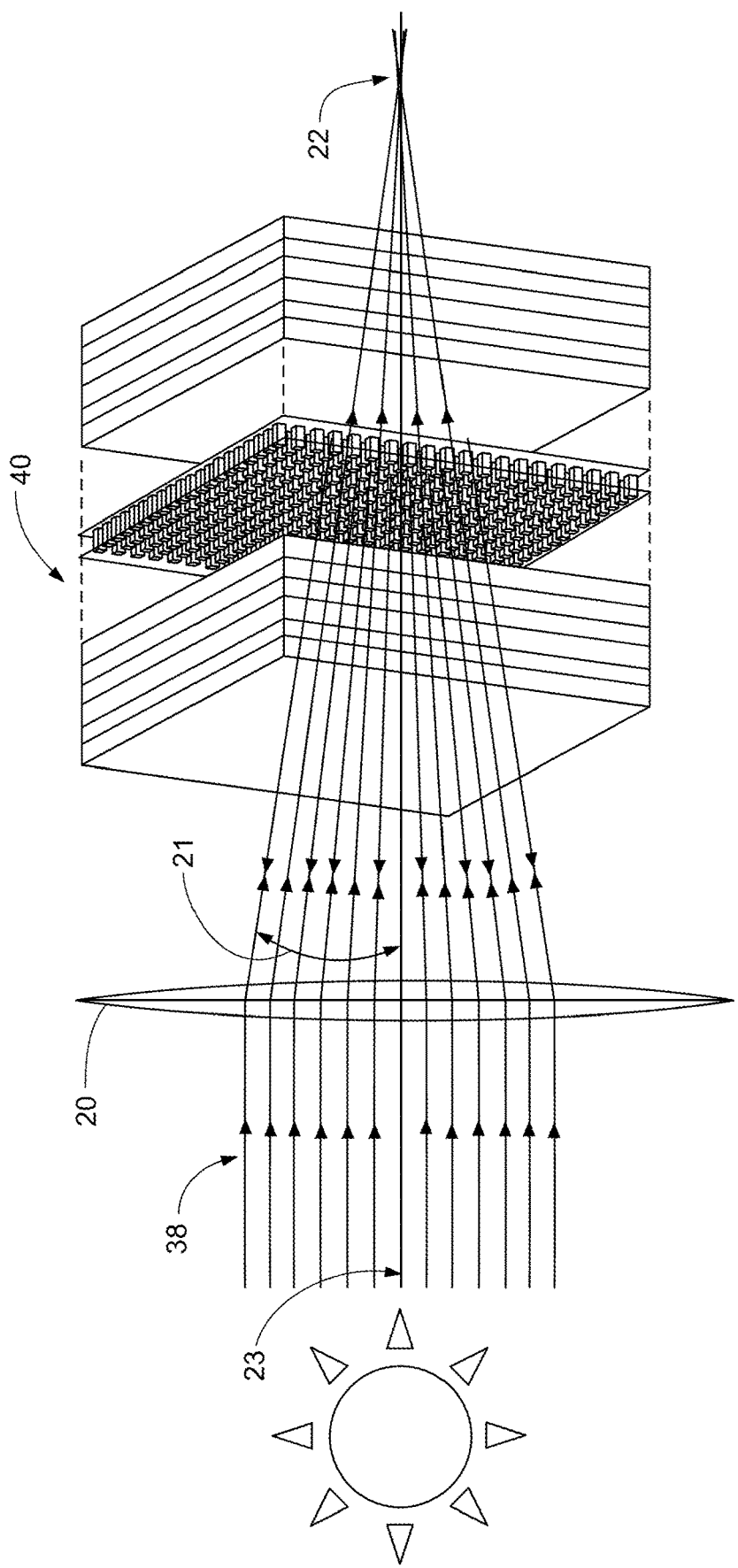

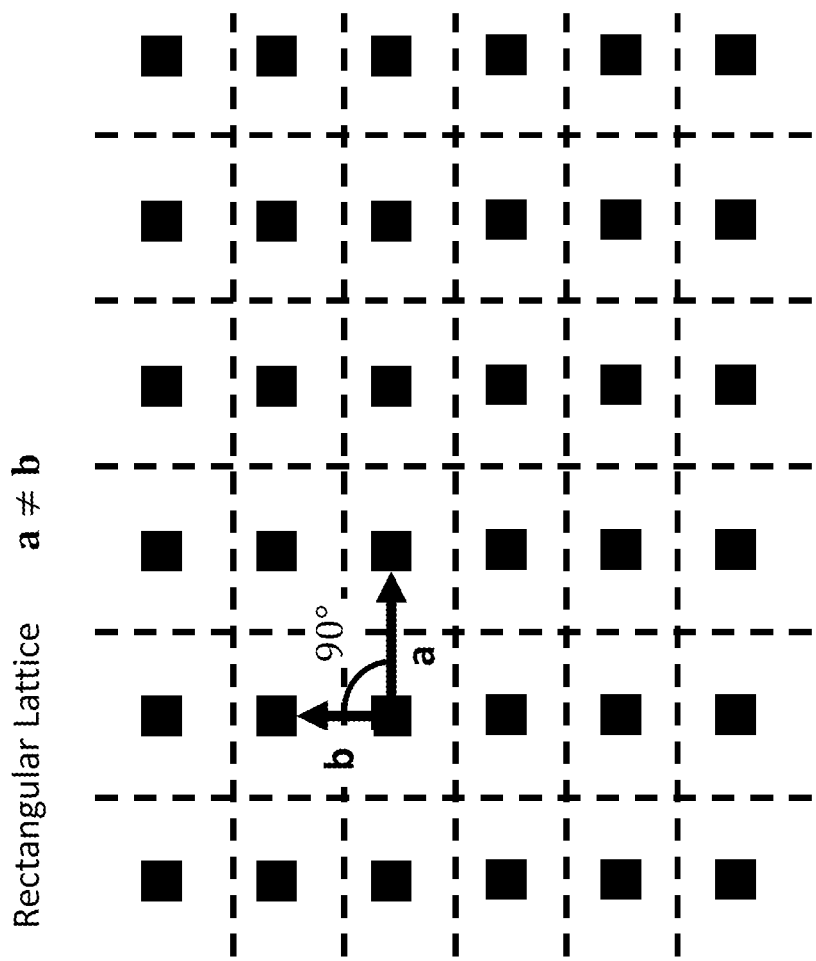

5-PAIR DBR

1-PAIR DBR

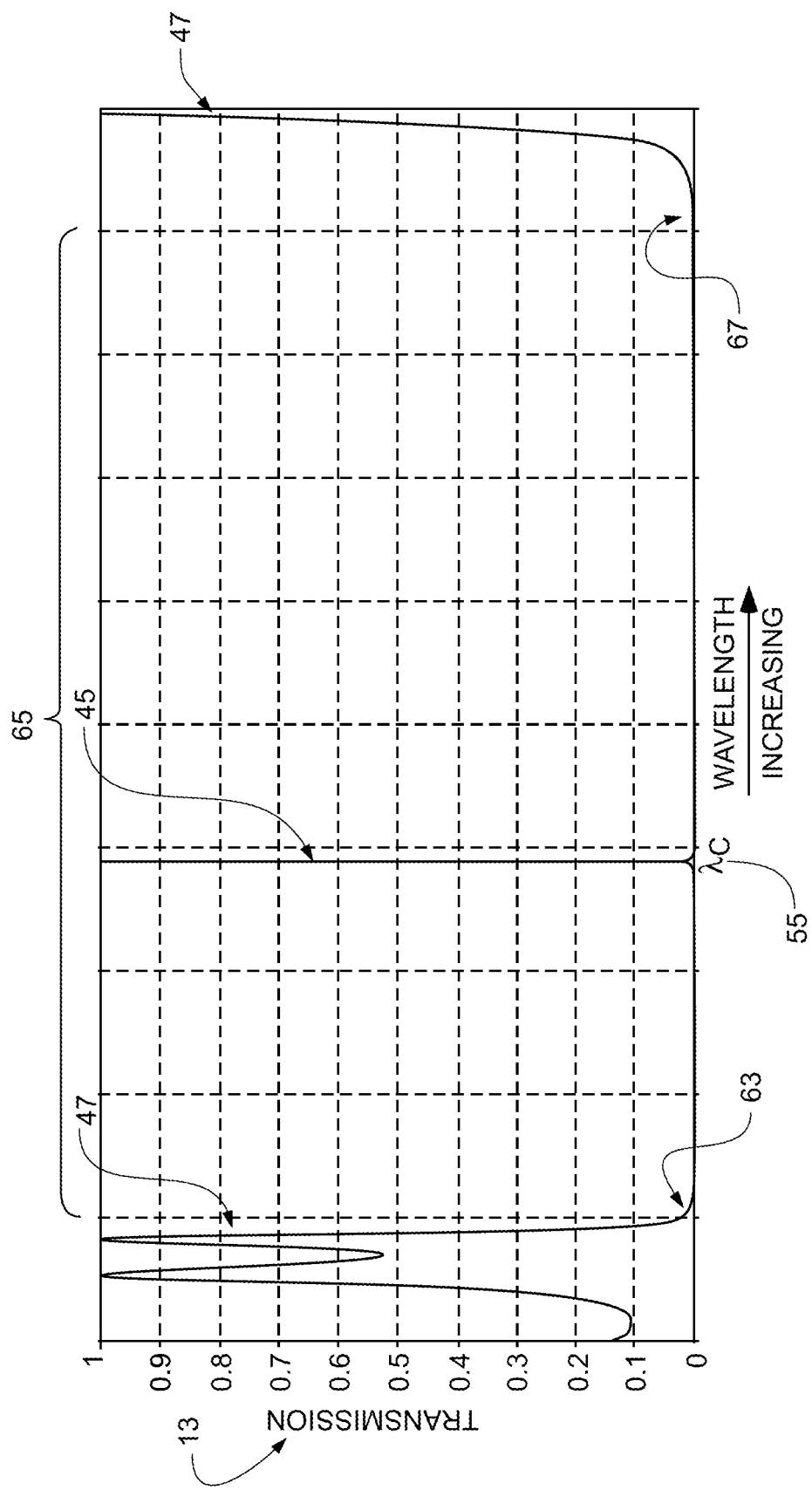

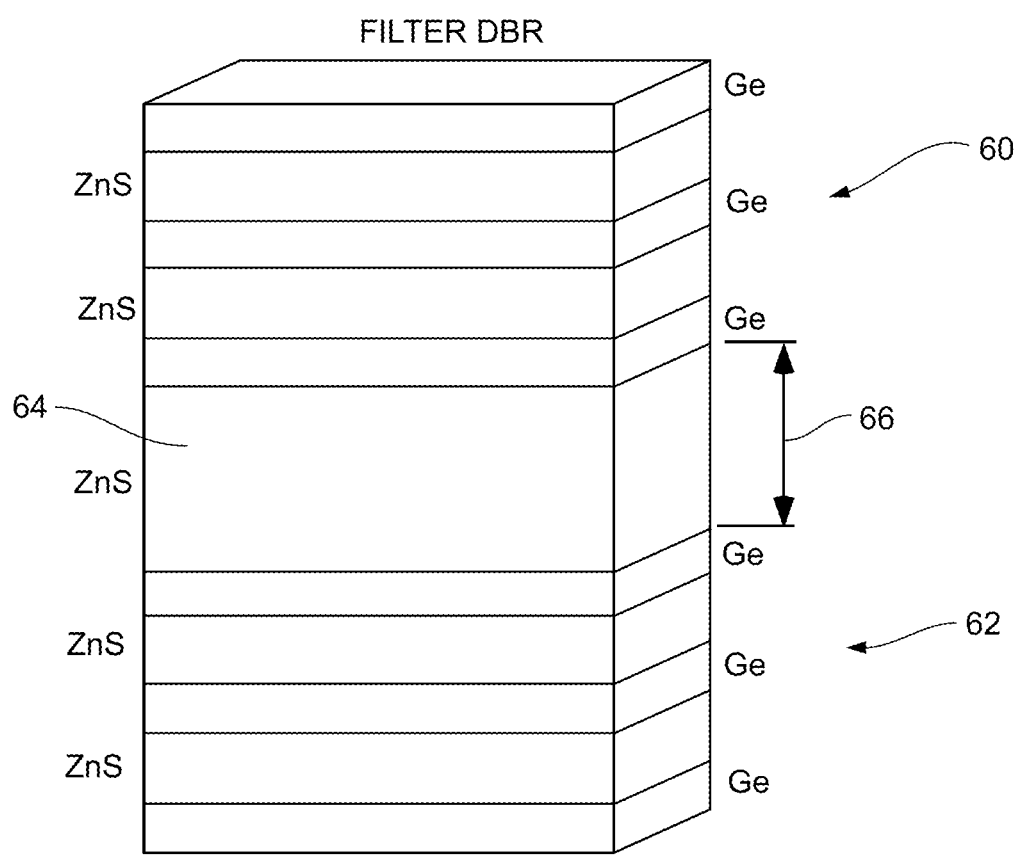

FILTERS WITH REDUCED ANGLE-OF-INCIDENCE DEPENDENCE

CROSS-REFERENCE TO RELATED APPLICATIONS

This application claims the benefit of and priority to U.S. Provisional Application Ser. No. 63/251,884 entitled "Hyperspectral Filters with Reduced Angle-of-Incidence Dependence," filed Oct. 4, 2021, the entirety of which is hereby incorporated herein by reference thereto.

STATEMENT REGARDING FEDERALLY SPONSORED RESEARCH OR DEVELOPMENT

This invention was made, in part, with government support under Contract No. 80NSSC18K0238 by National Aeronautics and Space Administration. The government has/may have certain rights in the invention.

FIELD OF THE DISCLOSURE

The present invention relates to narrow bandwidth filters for optical and infrared sensing, and in particular, to spectral filters.

BACKGROUND

Optical sensing is an important tool to obtain information about a scene or environment. For example, atoms (or molecules, chemicals and other species) absorb radiation at certain well-defined frequencies (v) or wavelengths ($\lambda$). For example, $CO_2$ has multiple absorption lines in the neighborhood of $\lambda=4.3$ µm (in the mid infrared spectral region), as well as other spectral regions. Other species of gasses have spectral lines in the same or different regions of the near, mid, and long-wavelength infrared spectral regions, as shown in FIG. 1.

The ability to perform optical and infrared sensing and discrimination of the different spectral absorption lines provides scientists with abundant information about the presence and concentration of various chemical, gaseous, and molecular species in an environment being monitored. Sensors that perform this spectral discrimination are called multispectral sensors or imagers (MSIs) or hyperspectral sensors and imagers (HSIs), and such systems require high precision optical and infrared filters systems. While a variety of dispersive elements are used in existing MSI/HSI systems, the most commonly used is a grating 10, as shown in FIG. 2. This type of component (i.e., the grating) is known as a dispersive element because it takes the incoming radiation 5 that is composed of a multitude of different wavelength components and disperses (i.e., spatially separates) the different wavelength components such that they travel along different paths, ultimately falling on different positions of a charge-coupled device ("CCD") 12, e.g., on different pixels, or some other pixelated optical detector, such as a focal plane array or "FPA."

These and similar conventional and existing systems perform well, but require certain conditions that limit their ability to be miniaturized and their ability to be mounted on small aerial and space-based platforms (e.g., drones and satellites)—something that is important to the sensing research community. Unfortunately, the use of typical dispersive elements 10 (e.g., gratings, prisms) requires additional free-space optical elements to be used, such as collimating lens 14, slits 16, and imaging lenses 18. These additional optical elements increase one or more of the important aspects: size, complexity, fragility, and cost. In particular, conventional gratings require the use of a collimating lens because the grating requires the incident light to be incident at a fixed angle of incidence ("AoI"). Otherwise, if beams are incident upon the grating 10 over a range of angles, the wavelength components will overlap with different wavelength components at the detector level (typically, a CCD or a focal plane array (FPA)), thereby ruining the spectral discrimination needed for the sensing application.

Another aspect of the use of this type of diffractive element is that it yields a continuum (i.e., hundreds or more) of wavelength components along one direction of the sensing device, for example, a CCD 12, as shown in the FIG. 2. Many applications do not need such a large number of spectral bands, and instead require a much more limited set that corresponds to particular spectral bands of interest. In fact, the very existence of these unnecessary spectral bands also impinging on the sensing device burdens the system with the need for increased computational resources to process and discard the signals from the system corresponding to these undesired spectral channels.

Accordingly, there is a need for a spectral filtering device, including hyperspectral and multi-spectral filtering devices, which can produce a plurality of passbands, with a reduced AoI dependence. There is also a need for such filtering devices in a miniaturized size, such that is suitable for mounting on small aerial and space-based platforms (e.g., drones and satellites).

SUMMARY

Features of the disclosure will become apparent from the following detailed description considered in conjunction with the accompanying drawings. It is to be understood, however, that the drawings are designed as an illustration only and not as a definition of the limits of this disclosure.

The present disclosure relates to devices for filtering incident radiation, including pixelated devices, with reduced dependence of the wavelength of the filtered radiation on angle of incidence.

The present disclosure is directed to a device for filtering of incident radiation, including an encapsulated layer including an array of micro-resonant elements arranged spatially distinct from each other in a plane of the device. Each micro-resonant element is formed of a first material and the array of micro-resonant elements is encapsulated within a second material to form the encapsulated layer. An index of refraction of the first material is higher than that of the second material. The device also includes a highly reflective filtering structure including at least one of an upper structure positioned a first distance above the encapsulated layer and a lower structure positioned a second distance below the encapsulated layer, wherein the highly reflective filtering structure is characterized by a stopband. The array of micro-resonant elements is configured to transmit a passband of incident radiation centered around a center wavelength, wherein the center wavelength falls within the stopband of the highly reflective filtering structure, and to minimize a dependence of the center wavelength on an angle of incidence of the incident radiation.

In embodiments, a size of each of the micro-resonant elements along an axis of the array is less than the center wavelength. Each of the micro-resonant elements is configured with the size and a shape and a periodicity on the array to support a mode at the center wavelength, wherein the size and the shape and the periodicity are configured to transmit the passband of incident radiation centered around the center wavelength.

In embodiments, a type of the array of micro-resonant elements is one of a rectangular, square, centered rectangular, oblique, and hexagonal array. The type of the array, together with the size, the shape and the periodicity of the array, may be configured to support the mode of each of the micro-resonant elements of the array at the center wavelength.

A cross-section of each of the micro-resonant elements in the plane of the encapsulated layer may be one of a rectangular, square, hexagonal, pentagonal, triangular, circular, semi-circular, elliptical, and an L shape.

The center wavelength of the passband, in embodiments, is determined at least in part by at least one of the first distance and the second distance of the highly reflective filtering structure from the encapsulated layer.

The periodicity of the array of micro-resonant elements along the axis of the array may be configured to minimize the dependence of the center wavelength on the angle of incidence.

In embodiments, the highly reflective filtering structure includes both the upper structure and the lower structure, wherein at least one of the upper structure and the lower structure is a distributed bragg reflector (DBR) structure formed of pairs of alternating layers of high-refractive index and low-refractive index layers.

The second material of the encapsulated material, in embodiments, extends across the second distance below the encapsulated layer and across the first distance above the encapsulated layer. The first distance and the second distance of the encapsulated layer including the array of micro-resonant elements from the upper structure and the lower structure, respectively, are configured to minimize the dependence of the center wavelength on the angle of incidence.

In further embodiments, further includes an upper spacer layer positioned between the upper structure and the encapsulated layer and a lower spacer layer positioned between the lower structure and the encapsulated structure. In embodiments, at least one of the upper spacer layer and the lower spacer layer is not formed of the second material of the encapsulating layer.

The present disclosure is also directed to a device for filtering of incident radiation, including a first pixel and a second pixel, wherein the first pixel transmits a first passband of incident radiation centered around a first center wavelength and the second pixel transmits a second passband centered around a second center wavelength. Each of the first pixel and the second pixel includes an encapsulated layer, and a highly reflective filtering structure including at least one of an upper structure positioned a first distance above the encapsulated layer and a lower structure positioned a second distance below the encapsulated layer, wherein the highly reflective filtering structure is characterized by a stopband.

The first pixel includes a first array of micro-resonant elements arranged spatially distinct from each other in a plane of the encapsulated layer, wherein each micro-resonant element is formed of a first material of the first array having a first index of refraction, and the first array of micro-resonant elements is encapsulated within a second material of the encapsulated layer having a second index of refraction, wherein the first index of refraction is higher than the second index of refraction. The second pixel includes a second array of micro-resonant elements arranged spatially distinct from each other in the plane of the encapsulated layer, wherein each micro-resonant element of the second pixel is formed of a third material having a third index of refraction that is higher than second index of refraction, wherein the second array of micro-resonant elements is also encapsulated within the second material of the encapsulated layer.

The first array of micro-resonant elements of the first pixel is configured to transmit the first passband of incident radiation centered around the first center wavelength, and the second array of micro-resonant elements of the second pixel is configured to transmit the second passband of incident radiation centered around the second center wavelength. Each of the first center wavelength and the second center wavelength falls within the stopband of the highly reflective filtering structure, and each of the first array and the second array are configured to minimize a dependence of the first center wavelength and of the second center wavelength, respectively, on an angle of incidence of the incident radiation.

In embodiments, the first index of refraction of the first material of the micro-resonant elements of the first array is the same as the third index of refraction of the third material of the micro-resonant elements of the second array.

In embodiments, a first size of each of the micro-resonant elements along an axis of the first array is less than the first center wavelength. Each of the micro-resonant elements in the first array is configured with the first size and a first shape and a first periodicity on the first array to support a mode of each of the micro-resonant elements of the first array at the first center wavelength. The first size and the first shape and the first periodicity are configured to transmit the first passband of incident radiation centered around the first center wavelength.

A second size of each of the micro-resonant elements along an axis of the second array is less than the second center wavelength. Each of the micro-resonant elements in the second array is configured with the second size and a second shape and a second periodicity on the second array to support a mode of each of the micro-resonant elements of the second array at the second center wavelength. The second size and the second shape and the second periodicity are configured to transmit the second passband of incident radiation centered around the second center wavelength. The second passband around the second center wavelength is distinct from the first passband around the first center wavelength.

In embodiments, each of the first periodicity of the first array of micro-resonant elements along the axis of the first array, and the second periodicity of the second array of micro-resonant elements along the axis of the first array is configured to minimize the dependence of the first center wavelength and the second center wavelength, respectively, on the angle of incidence.

In further embodiments, the second size of each of the micro-resonant elements of the second array is smaller than the first size of each of the micro-resonant elements of the first array, and the second center wavelength of the second passband is shorter than the first center wavelength.

In embodiments, a type of each of the first array and the second array of micro-resonant elements is one of a rectangular, square, centered rectangular, oblique, and hexagonal array.

The type of the first array, together with the first size, the first shape and the first periodicity of the first array, may be configured to support the mode of each of the micro-resonant elements of the first array at the first center wavelength. The type of the second array, together with the second size, the second shape and the second periodicity may be configured to support the mode of each of the micro-resonant elements of the second array at the second center wavelength.

In embodiments, the first shape and the second shape are one of a rectangular, square, hexagonal, pentagonal, triangular, circular, semi-circular, elliptical, and an L shape.

In further embodiments, the first center wavelength of the first passband and the second center wavelength of the second passband are determined at least in part by one of the first distance and the second distance of the highly reflective filtering structure from the encapsulated layer.

In embodiments, the highly reflective filtering structure includes both the upper structure and the lower structure.

At least one of the upper structure and the lower structure may be a distributed bragg reflector (DBR) structure formed of pairs of alternating layers of high-refractive index and low-refractive index layers.

In embodiments, the second material of the encapsulated material extends across the second distance below the encapsulated layer and across the first distance above the encapsulated layer. The first distance and the second distance of the encapsulated layer from the upper structure and the lower structure, respectively, are configured to minimize the dependence of the center wavelength on the angle of incidence.

The device may also include, in further embodiments, an upper spacer layer positioned between the upper structure and the encapsulated layer and a lower spacer layer positioned between the lower structure and the encapsulated structure. In embodiments, at least one of the upper spacer layer and the lower spacer layer is not formed of the second material of the encapsulating layer.

In addition to the above aspects of the present disclosure, additional aspects, objects, features and advantages will be apparent from the embodiments presented in the following description and in connection with the accompanying drawings.

BRIEF DESCRIPTION OF THE DRAWINGS

The drawings constitute a part of this disclosure and include examples, which may be implemented in various forms. It is to be understood that in some instances, various aspects of the disclosure may be shown exaggerated or enlarged to facilitate understanding. The teaching of the disclosure can be readily understood by considering the following detailed description in conjunction with the accompanying drawings.

FIG. 1 is a graph of spectral absorption lines for various gasses: $H_2O$: water; $CO_2$: carbon dioxide; CO: carbon monoxide; NO: nitric oxide; $NO_2$: nitrogen dioxide; $CH_4$: methane; $O_3$: oxygen; $NH_3$: ammonia.

FIG. 2 is a schematic of conventional existing HSI systems. Conventional systems use a dispersive element (i.e., the grating) to spatially-separate the wavelength components of the incident beam.

FIG. 4A is a pictorial representation of embodiments of a pixel of a device of the present disclosure configured to perform a single filtering function, and of an embodiment of a device of the present disclosure configured to perform a single filtering function.

FIG. 4B is a pictorial representation of an imaging system that includes an embodiment of a device of the present disclosure.

FIGS. 5F-5J are schematic representations of embodiments of types of arrays of unit cells and micro-resonators of the present disclosure, including square, rectangular, centered rectangular, oblique, and hexagonal, respectively.

FIG. 8A is an exemplary transmission vs. wavelength plot of embodiments of a pixel of a device of the present disclosure depicting a narrow passband within a wide stopband.

FIG. 9A is a pictorial representation of a conventional dual DBR structure that exhibits both a wide stopband and a narrow passband.

FIG. 14 also represents a plurality of passbands transmitted in an embodiment of a pixelated device of the present disclosure.

Figure 3B:
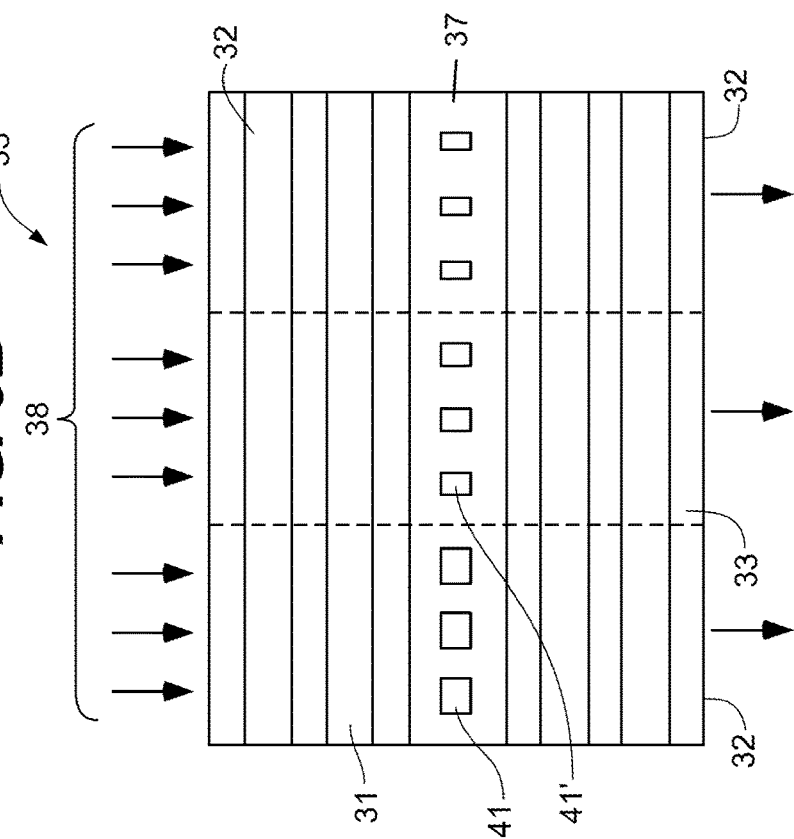
FIG. 3B is a pictorial representation of a vertical cross-section through the pixels of FIG. 3A.

The various aspects of the present disclosure mentioned above are described in further detail with reference to the aforementioned figures and the following detailed description of exemplary embodiments.

DETAILED DESCRIPTION

The following sections describe exemplary embodiments of the present invention. It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto.

Particular illustrative embodiments of the present disclosure are described hereinbelow with reference to the accompanying drawings; however, the disclosed embodiments are merely examples of the disclosure, which may be embodied in various forms. It should be apparent to those skilled in the art that the described embodiments provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the devices for filtering incident radiation of the invention as defined herein and equivalents thereto. Well-known functions or constructions and repetitive matter are not described in detail to avoid obscuring the present disclosure in unnecessary or redundant detail. Therefore, specific structural and functional details disclosed herein are not to be interpreted as limiting. In this description, as well as in the drawings, like-referenced numbers represent elements which may perform the same, similar, or equivalent functions.

Throughout the description, where items are described as having, including, or comprising one or more specific components or features, or where methods are described as having, including, or comprising one or more specific steps, it is contemplated that, additionally, there are items of the present disclosure that consist essentially of, or consist of, the one or more recited components or features, and that there are methods according to the present disclosure that consist essentially of, or consist of, the one or more recited processing steps.

The terms "transparent" or "primarily transparent" are used herein to describe transparent materials that absorb less than 25%, and "substantially transparent" is defined herein to describe transparent materials that absorb less than 50% of the incident radiation.

A passband filter of "high" transmission has greater than 50% transmission.

A "center wavelength" of the passband falls in the center of a bandwidth, i.e., the full width half maximum (FWHM) of the transmission curve of the passband.

The term "approximate" in reference to thicknesses, for example, represents +/−25% of the stated thickness.

"Incident radiation" impinging on the devices of the present disclosure means any type of light or electromagnetic radiation, which can be from any type of source, including, but not limited to: astronomical objects; gasses and other chemical and molecular species; objects that are emitting infrared radiation due to thermal processes and temperature variations; visible and infrared emissions from industrial, manufacturing, and other commercial processes; and sources of infrared radiation that involve security and defense applications, and other sources.

Accordingly, the devices formed in accordance with the present disclosure include, but are not limited to, hyperspectral filters, multi-spectral filters, and laser line filters.

The present disclosure relates to devices for spectral filtering, including hyperspectral and multi-spectral filtering devices, having a reduced angle of incidence ("AoI") dependence. Embodiments of the device are referred to herein as a metamaterial hyperspectral filter ("MHF"). As used herein, the term metamaterial means any micro or nanopatterned structure that interacts with light or electromagnetic radiation in one or more complex ways. As described herein, arrays of micro-resonant elements of the device provide the metamaterial.

In embodiments, a device of the present disclosure (see device 40 of FIG. 4A, for example) may be constructed to filter radiation in the same way across the entirety of the device, e.g., the device may be constructed to perform a filtering function, such as filtering radiation according to a particular wavelength, polarization, or both wavelength and polarization, across the entire device, with no, or negligible dependence on the AoI of incident radiation over a predetermined range of angles of incidence. As further described herein, "negligible" or "reduced" AoI as used herein means a shift of less than 1% of a center wavelength 55 of transmitted radiation over a range of AoI, e.g., in embodiments, from 0 to 12 degrees. The device 40 of FIG. 4A may be described as having a single pixel 32 formed in accordance with the present disclosure, configured to perform a particular predetermined filtering function across the entirety of the device 40.

In other embodiments, a device 30 of the present disclosure may be characterized as being pixelated, or segmented, wherein each pixel 32 (see FIGS. 3A and 3B, pixels 32 shown in cross-section in FIG. 3B), corresponds to a portion of a volume of the device 30 constructed to provide a predetermined filtering function. The device 30, for example, may include a plurality 35 of pixels 32, each pixel 32 constructed and tuned to perform a different filtering function. For example, in embodiments, referring to FIGS. 8A and 8B, the pixel 32 of the devices of the present disclosure may be constructed to transmit a single narrow passband of incident radiation 38, within a stopband 65 characterized by the device, wherein the passband 45 is characterized by a center wavelength 55 at a center of a bandwidth 53 defined at the half-max of the transmission curve of the passband 45. In embodiments of the device 30 including the plurality 35 of pixels 32, the passband 45 and center wavelength 55 for each pixel 32 changes, or shifts, from one (first) pixel 31 to an adjacent (second) pixel 33 and so on, with preferably no overlap of the passband 45 from the first pixel 31 to the second, or adjacent, pixel 33.

Figure 5A:
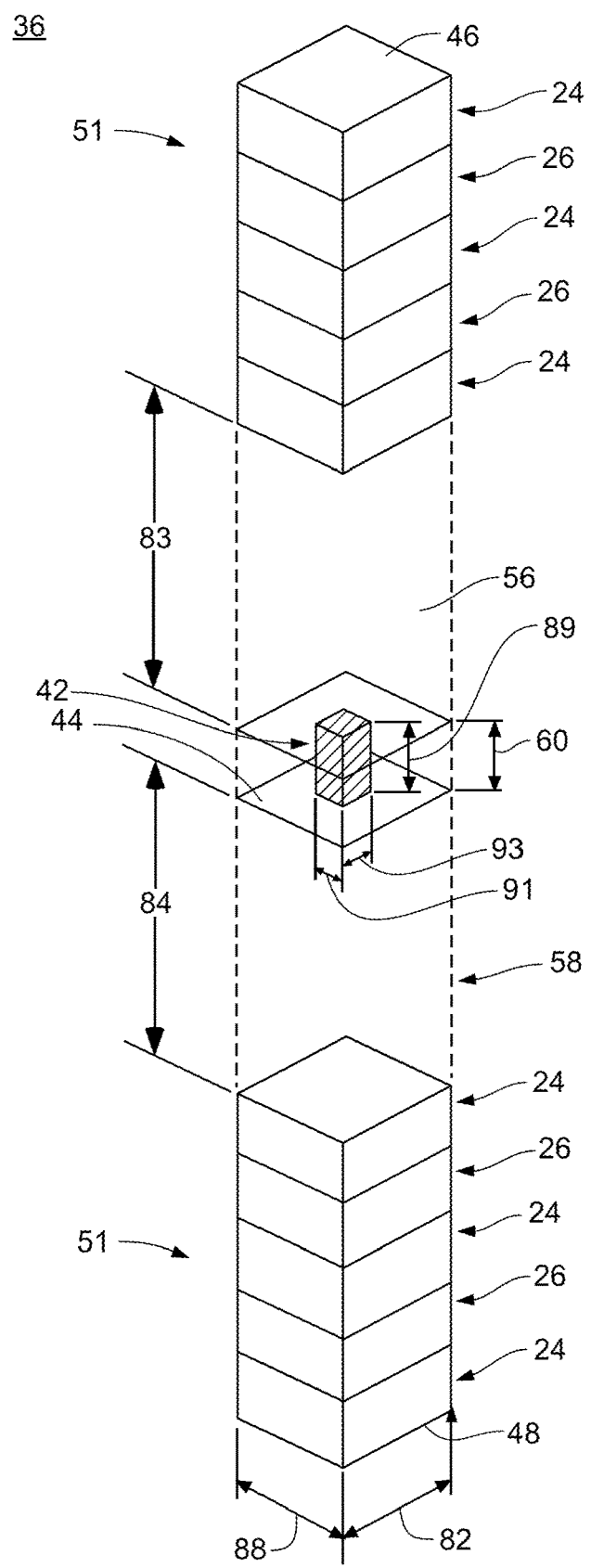
FIG. 5A is a pictorial representation of an embodiment of a unit cell of the disclosure.
Figure 5B:
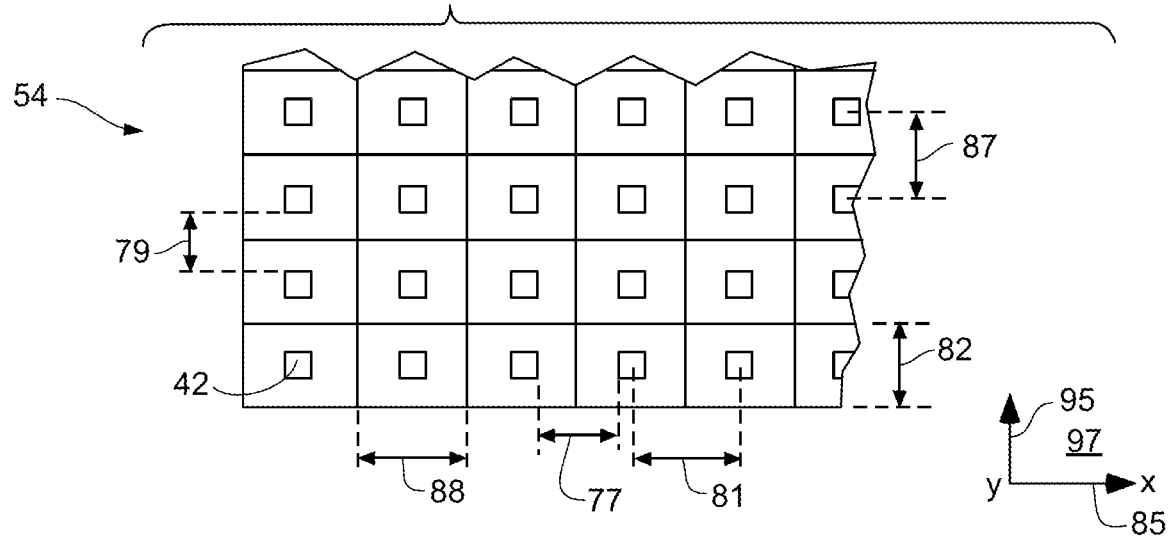
FIG. 5B is a schematic representation of a cross-section through an embodiment of an encapsulation layer of a pixel depicting a periodic array of micro-resonator elements corresponding to a periodic array of unit cells in the pixel.

Referring to FIG. 4A, as well as to FIGS. 5A and 5B, each pixel 32 of the device may be constructed as a periodic array 34 of unit cells 36 (FIG. 5A), wherein each unit cell 36 corresponds to a vertical, volumetric structure within each pixel 32, which is repeated on the periodic array 34 to form the pixel 32. In the embodiment shown, the periodic array 34 is a two-dimensional periodic array. Accordingly, the unit cell 36 is characterized as having a length 88, and a width 82, defined along each of an x-axis 85 and a y-axis 95, respectively, in a plane 97 of the unit cell 36, the plane 97 being defined as normal to incident radiation 38 (or the optical axis 23) in use (see FIG. 4B). The length 88 and width 82 also correspond to a repeat length 81 and width 87, of the (two-dimensional) periodic array 34 also referred to as a periodicity 81, 87 along each of the x-axis 85 and the y-axis 95, respectively.

Embodiments 40, 30 of the device of the present disclosure may be constructed as a complex optical or electromagnetic structure that functions as a single chip-sized optical filter (e.g., approximately 1 cm×1 cm in size). In other embodiments, the plurality 35 of pixels 32, performing different filtering functions may be arranged to form a pixelated array of optical filters on a monolithic chip. The plurality 35 of pixels 32 may be arranged in a one-dimensional or two-dimensional array on the chip.

Figure 7:
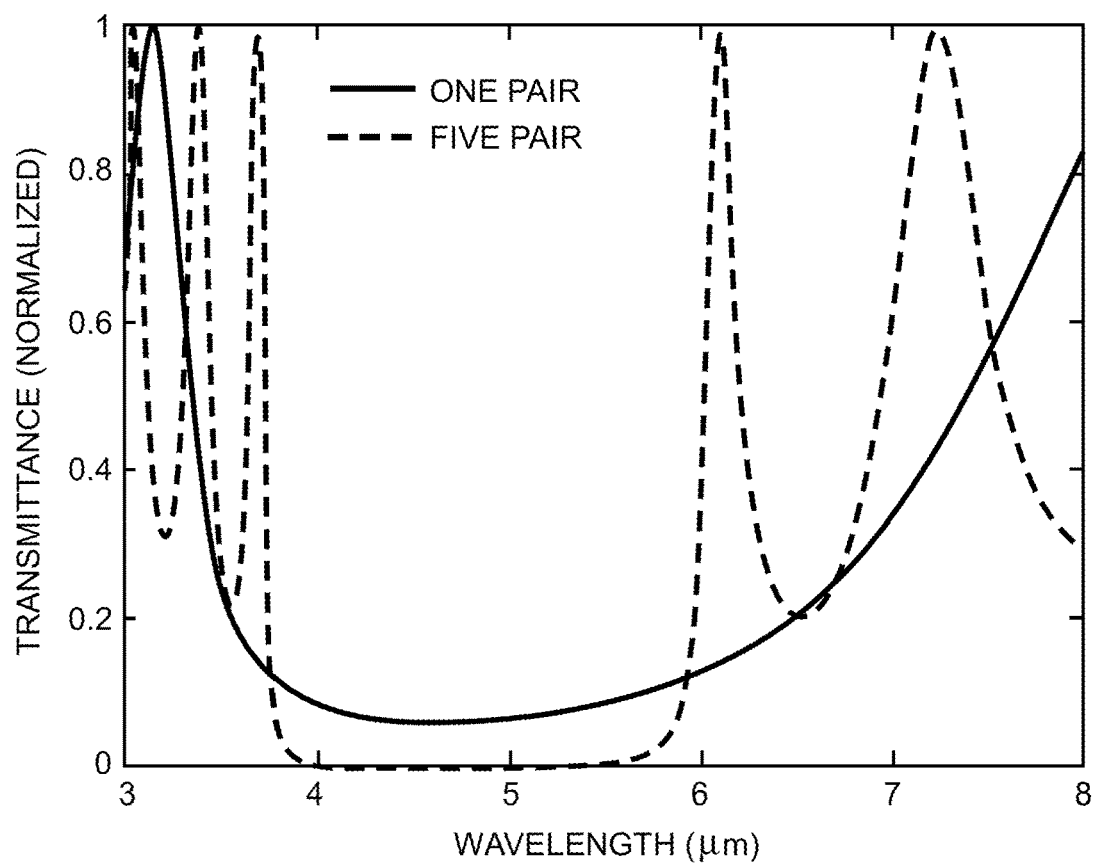
FIG. 7 is a graphical representation of transmittance of the DBR structures of FIGS. 6A and 6B, showing an increase in efficiency, or comprehensiveness, of the DBR's anti-transmission property as the number of high-index/low-index films increases.
Figure 8B:
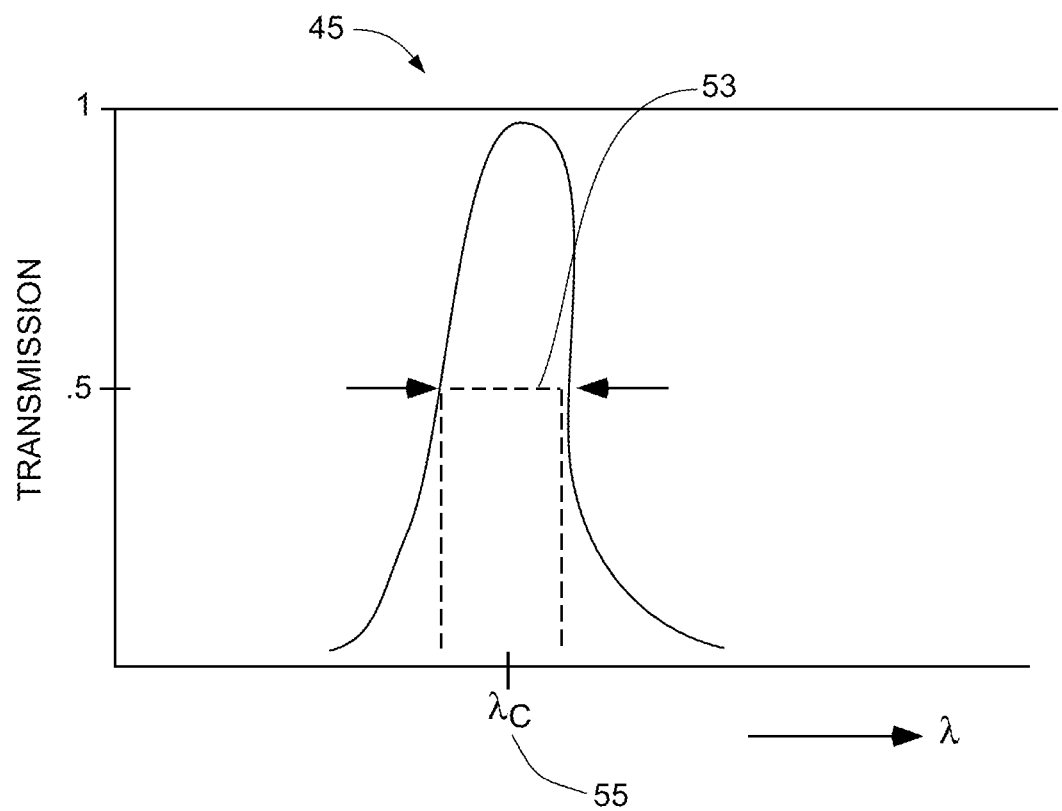
FIG. 8B is a transmission versus wavelength plot representing a passband characterized by a bandwidth around a center wavelength.

The pixels 32 and thus devices 30, 40, of the present disclosure may be constructed to allow a high transmission 13 (FIG. 8A) of components of the incident beam 38 (see FIGS. 3B and 4B) of optical or electromagnetic radiation that fall within a range of wavelengths $\lambda_c$ (or frequency j), i.e., within the passband 45 (see FIG. 8B), wherein the passband 45 is positioned somewhere within the spectral range of the stopband 65 (see, e.g., FIGS. 7, 8A). In embodiments of the device of the present disclosure, the passband 45 and center wavelength 55 vary from a first pixel 31 to a second pixel 33 and so on (see FIG. 3A).

Figure 14:
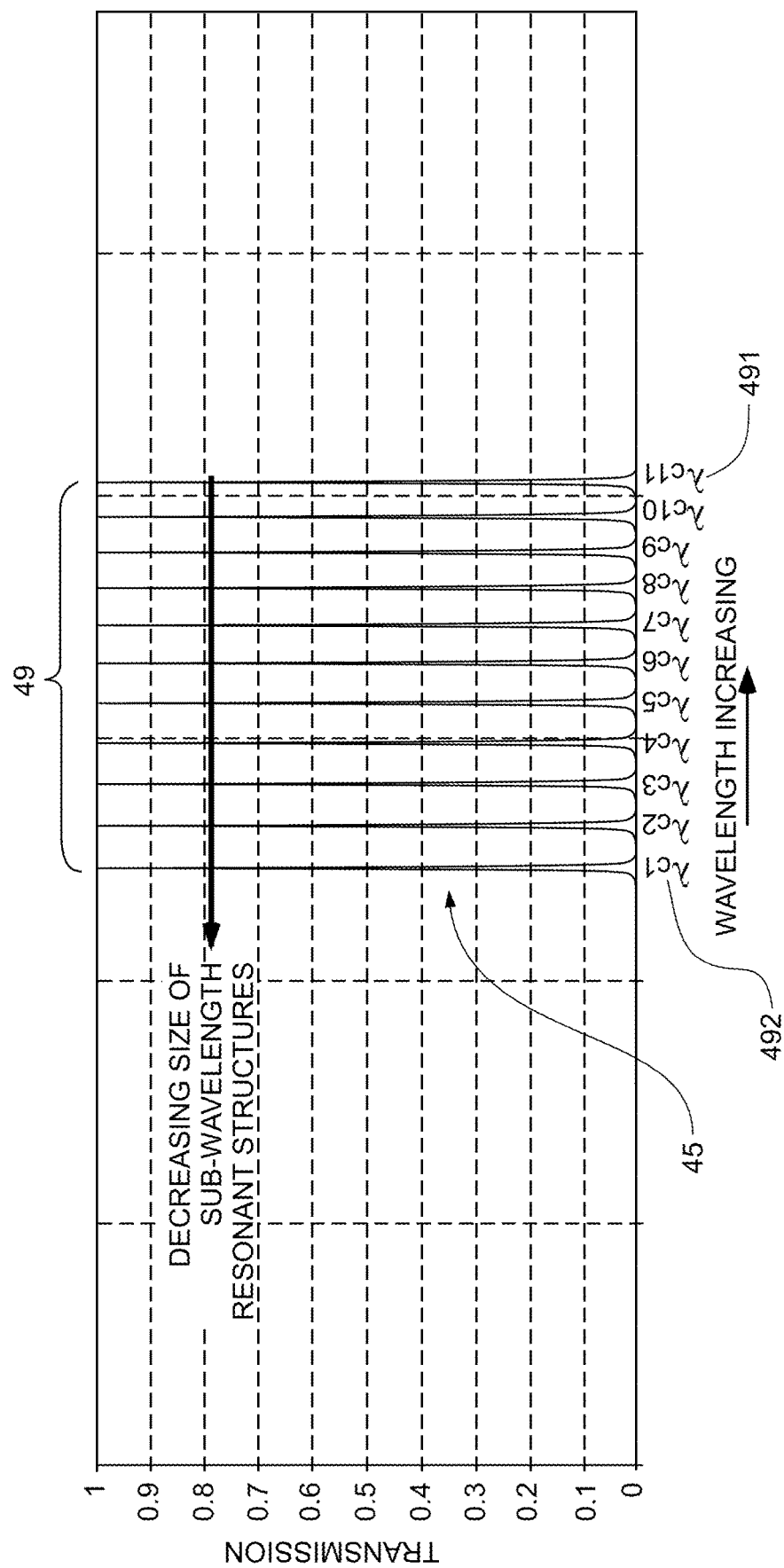
FIG. 14 is a graphical representation of a transmission of a passband for each of a number of micro-resonant elements of different physical sizes, indicating that the passband can be tuned or shifted to shorter wavelengths by decreasing the size of the micro-resonant elements.

Because the passband 45 achieved by a pixel 32 of the device, in embodiments, is narrow, e.g., with a bandwidth 43 less than 1% of the center wavelength 55, a pixelated device 30 of the present disclosure can include a plurality 49 of passbands 45 within the stopband 65, as represented, for example, in FIG. 14. As further described herein, this is achieved by tuning the shapes and periodicity of the arrays of micro-resonator elements 42 from pixel 31 to pixel 33 to obtain a highly transmissive passband 45 around the center wavelength ($\lambda_c$) 55, for each pixel 32, between the short wavelength cutoff 63 and the long wavelength cutoff 67 of the stopband 65 (see FIG. 8A).

In embodiments, a device of the present disclosure may include at least 1,000 pixels providing at least 1,000 passbands 45 and spectral channels.

In embodiments, the bandwidth 53 (defined as full-width half max "FWHM") of the passband 45 of a pixel 32 of the device of the present disclosure is 1% or less of the center wavelength 55.

In embodiments, the bandwidth 53 of a pixel 32 of the device of the present disclosure is between 0.01 and 1% of the center wavelength 55. In other embodiments, the bandwidth 53 of the pixel 32 is between 0.01 and 0.1% of the center wavelength 55.

The devices of the present disclosure are also characterized as having a low, or reduced, dependence on the AoI of the incident beam 38 compared to prior art filters. Accordingly, the device of the present disclosure requires far less, if any, collimating optics, like the filters or gratings of the prior art (see FIG. 2), but allows for an AoI 21 of the incident beam 38, that is not normal to the device 40. Referring to FIG. 4B, for example, the incident radiation 38 from a broadband source, for example, may be collected through a collecting lens 20 and focused either onto, or through, one of the devices, e.g., device 40, of the disclosure. The device 40, in embodiments, transmits the passband 45 with center wavelength 55, to a focal point or plane 22 that is located relative to an optical axis 23 of the collecting lens 20, the optical axis 23 also defining a direction normal to the plane 97 of the device 40, in blocking radiation outside the narrow passband from passing through the device 40, by the mechanisms of reflection or absorption, as further described herein.

This reduced dependence on the AoI is achieved via the unique geometry of the pixels 32 of the device of the present disclosure, each pixel 32 including the periodic array 34 of unit cells 36 as described above with reference to FIGS. 5A and 5B. Referring to FIGS. 5A and 4A, in embodiments, each unit cell 36 includes a micro-resonator element 42 encapsulated within a spacer layer, referred to herein as an encapsulating layer 44. The unit cell 36 and pixels 32 also include a highly reflective filtering structure 51, which includes, in embodiments, at least one of an upper structure 50 positioned vertically above the encapsulating layer 44 (on an incident side 46 of the device 30), and a lower structure 52 positioned vertically below the encapsulating layer 44 (on a transmission side 48 of the device 30).

Referring to FIG. 5A, in embodiments, the encapsulating layer 44 may be positioned vertically a distance 84 above the lower structure 52, wherein the lower structure 52 is the highly reflective filtering structure 51. In other embodiments, the encapsulating layer 44 may be positioned vertically a distance 83 below the upper structure 50, wherein the upper structure 50 is the highly reflective filtering structure 51.

In embodiments, the highly reflective filtering structure 51 of the device includes both the upper structure 50 and the lower structure 52, and the encapsulating layer is positioned in a gap layer 39 between them, and vertically positioned a distance 84 above the lower structure 52, and a distance 83 below the upper structure 50.

In further embodiments, one of the upper structure 50 and the lower structure 52 is the highly reflective filtering structure 51, and the other one of the upper structure 50 and the lower structure 52 is a substrate.

In still other embodiments, referring to FIG. 4A, the device may include a substrate layer 90 positioned above the upper structure 50 or, in embodiments, below the lower structure 52.

In embodiments, the material of the substrate layer 90 may include, but is not limited to, silicon, silicon nitride, silicon dioxide, titanium dioxide, aluminum oxide, diamond, germanium, zinc sulfide, zinc selenide, spin-on glass (hydrogen silsesquioxane), silica, quartz, fused silica, glass, sapphire, other oxides, nitrides, oxynitrides, air, or vacuum, and metals such as aluminum, copper, or gold.

In embodiments, the highly reflective filtering structure 51, including one or both of the upper structure 50 and lower structure 52, is a distributed Bragg reflector (DBR).

Still referring to FIGS. 4A and 5A, the unit cell 36, and, consequently, each pixel 32 constructed from the array 34 of unit cells 36, as well as the device 30 constructed of a plurality of pixels 32, further includes an incident side 46, onto which the incident beam 38 of radiation impinges, and a transmission side 48 through which the filtered radiation emerges. Referring also to FIG. 5B, because each pixel 32 is constructed from the periodic array 34 of unit cells 36, each pixel 32 as well as the device of the disclosure may also be described as including a periodic array 54 of micro-resonators 42 encapsulated in the encapsulating layer 44. The micro-resonators 42 arranged in the periodic array 54, which are formed of a first material 41 having a first index of refraction, are surrounded by, i.e., encapsulated by, a second material 37 having a second index of refraction (see FIG. 3B) which is, in embodiments, in the form of an encapsulating film or layer, i.e., encapsulating layer 44, having a thickness 60 (see FIG. 4A) corresponding to, e.g., sufficient to cover, a height 89 (FIG. 5C) of the micro-resonators 42.

Figure 5C:
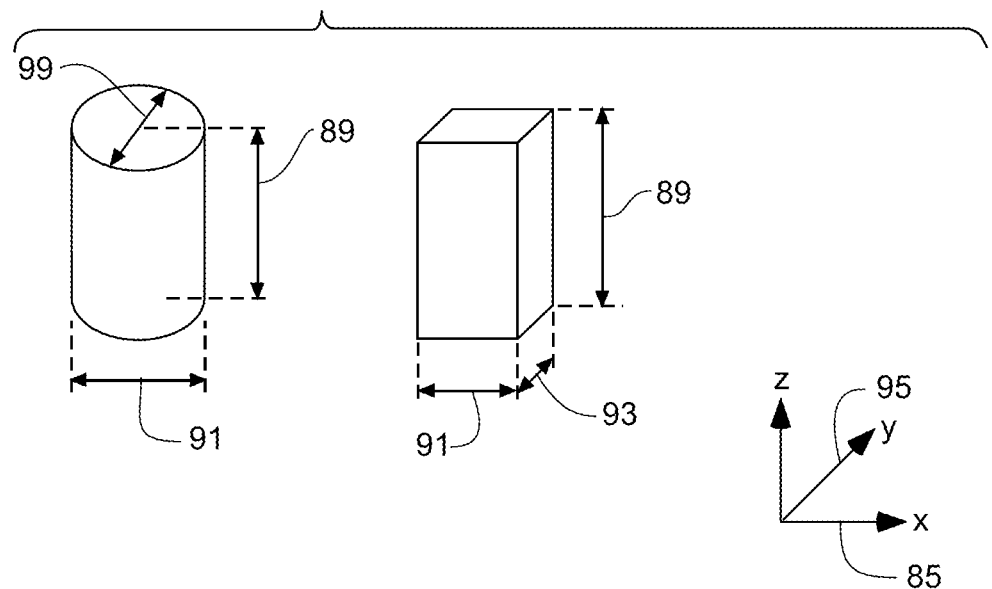
FIG. 5C is a pictorial representation of exemplary geometries of the micro-resonator elements.
Figure 5D:
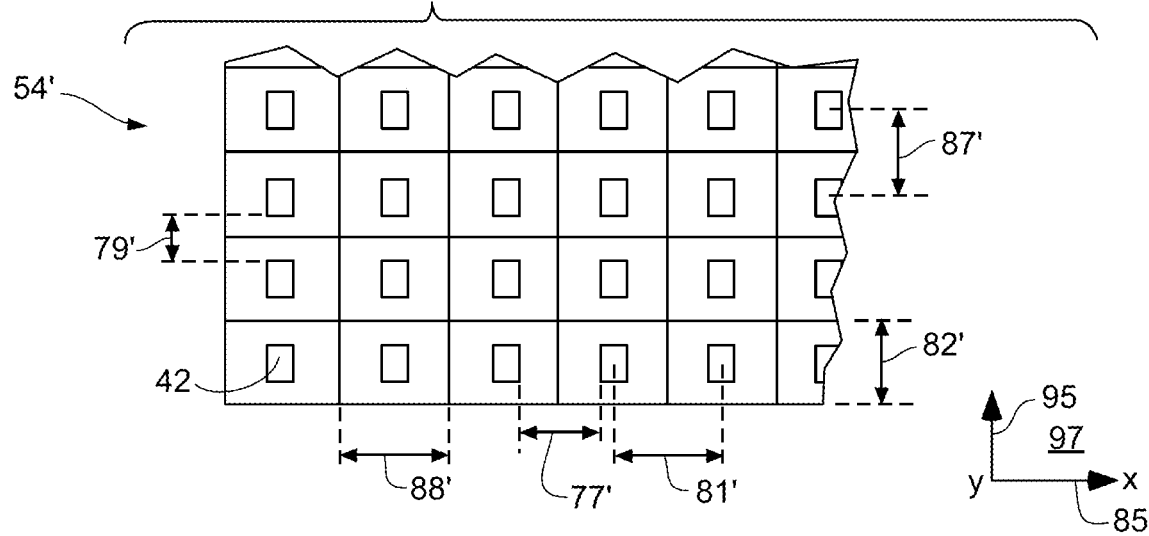
FIG. 5D is a schematic representation of a cross-section through an embodiment of an encapsulation layer of a second pixel in a device of the present disclosure depicting a second array of micro-resonator elements corresponding to a periodic array of unit cells in the second pixel.

It should be noted that, although the two-dimensional arrays 34 of unit cells 36 and arrays 54 of micro-resonators 42, shown and described herein in reference to FIGS. 5B and 5D, the arrays 34, 54 may be of any of the five Bravais lattice types. As represented in FIGS. 5F to 5J, the type of array may be one of square, rectangular, centered rectangular, oblique, and hexagonal, respectively.

In other embodiments, the unit cells 36, and thus the micro-resonators 42, may be arranged in a non-periodic or aperiodic fashion.

In embodiments of the device 30 of the present disclosure including plurality 35 of pixels 32, referring to FIG. 3B, the first material 41 of the micro-resonant elements 42 in adjacent pixels 31, 33, i.e., in the first pixel 31 and the second pixel 33 of the pixelated device 30, is the same, having the same index of refraction. In other embodiments, the first index of refraction of the first material 41 of micro-resonant elements 42 in the first pixel 31 may be different than a third index of refraction of a first material 41' (also referred to herein as a third material 41' for clarity) of micro-resonant elements 42 in the second pixel 33.

In embodiments, an index of refraction of the first material 41, 41' of micro-resonators 42 is higher than an index of refraction of the second material 37 which encapsulates the micro-resonant elements 42.

Referring to FIG. 5B, the periodicity 81, 87 of the periodic array 54 of micro-resonators 42 defined in the plane 97 of the encapsulating layer 44, along the x- 85 and y-axis 95, respectively, corresponds to a length 88 and width 82 of the unit cell 36. The geometry of the micro-resonator elements 42, however, is independent of the shape of the periodic array 34 of unit cells 36 and of periodic array 54 of the micro-resonators 42. In the embodiment of FIG. 5A, the micro-resonators 42 have a rectangular profile, however, as further described herein, the micro-resonators 42 may be selected from a number of different shapes, including being of a cylindrical geometry with circular profiles as shown and described further herein. Generally, as shown in FIG. 5C, each micro-resonator 42 is characterized as having a height 89 perpendicular to the plane 97 of the encapsulating layer 44, a length 91 along the x-axis 85, and a width 93 along the y-axis 95. In the case of a cylindrical geometry with a circular profile, a diameter 99 is defined.

In embodiments, the periodicity 81, 87 of the periodic array 54 along the x- and or y-axis may correspond to a value that is between 0.01% and 1% of the center wavelength 55.

Figure 5E:
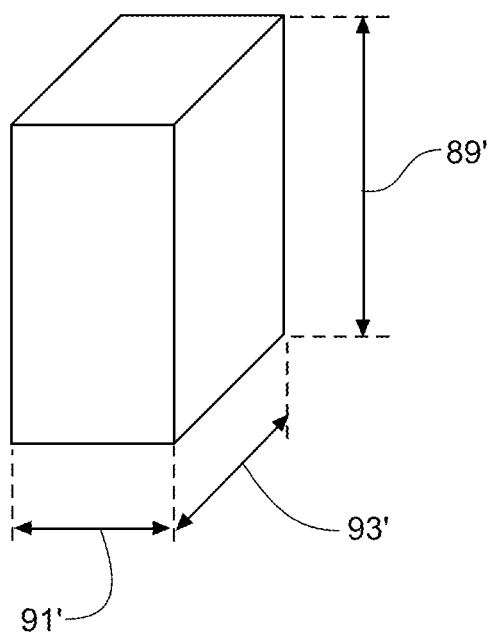
FIG. 5E is a pictorial representation of an exemplary geometry of the micro-resonator elements in the second pixel represented in FIG. 5D.
Figure 5F:
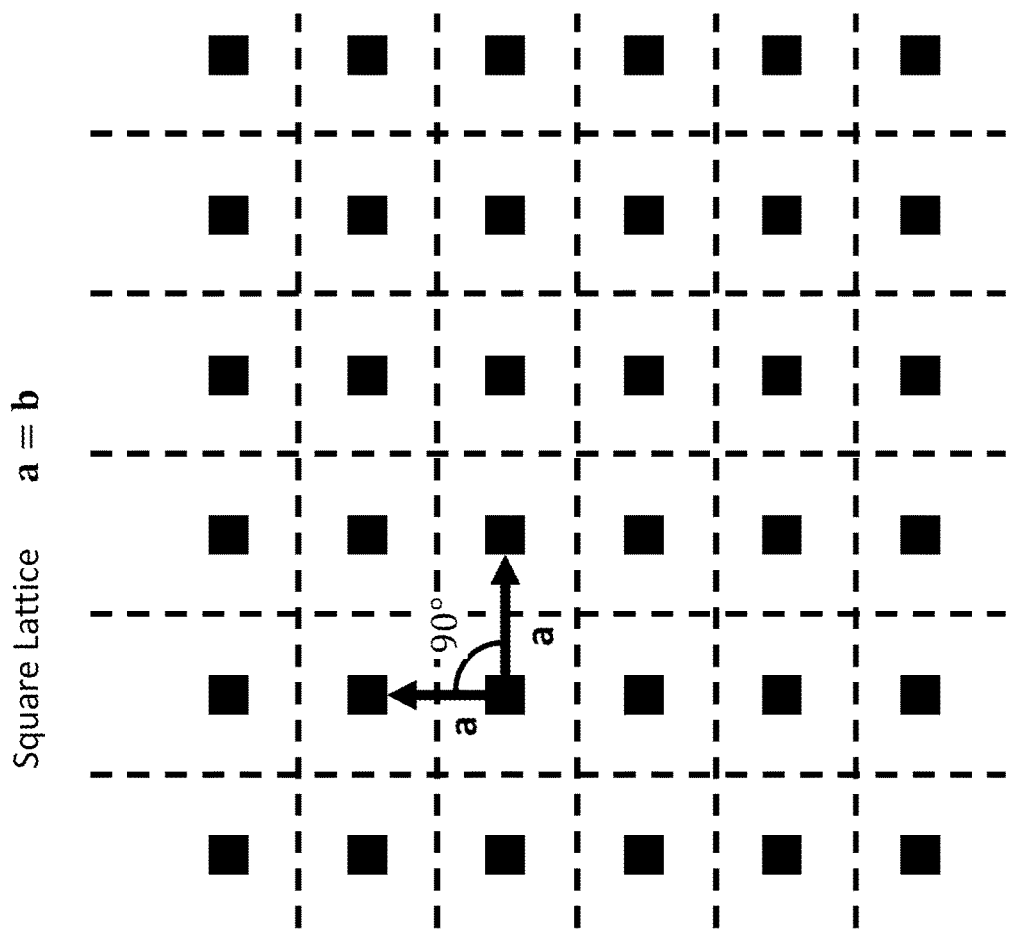
Figure 5H:
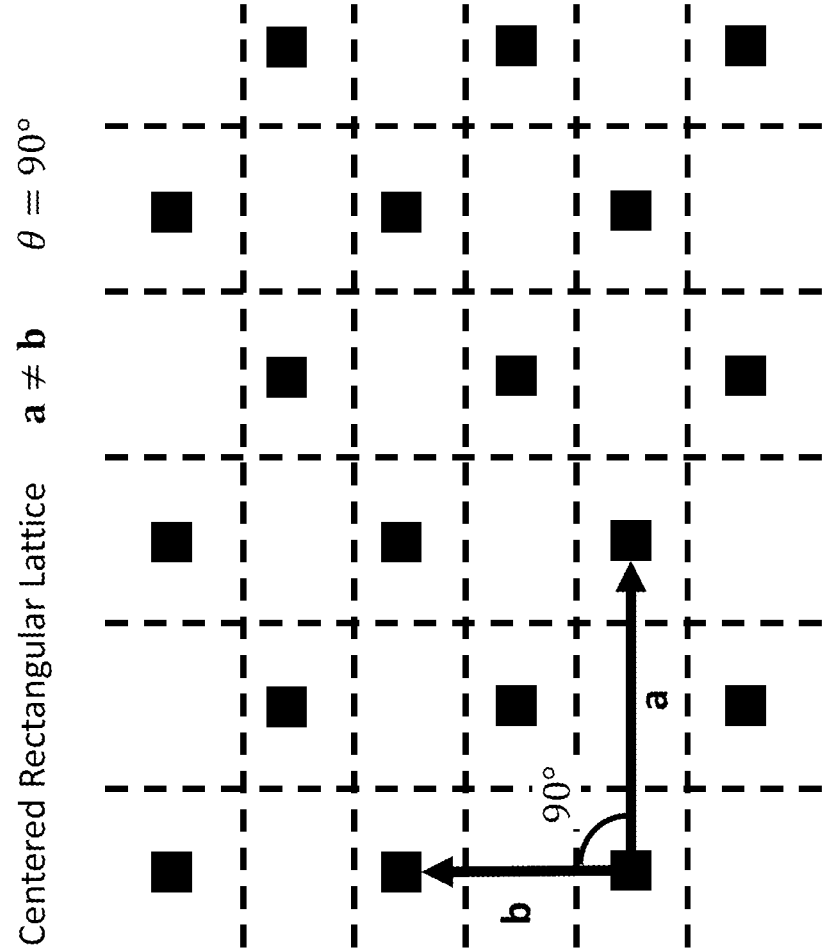
Figure 5I:
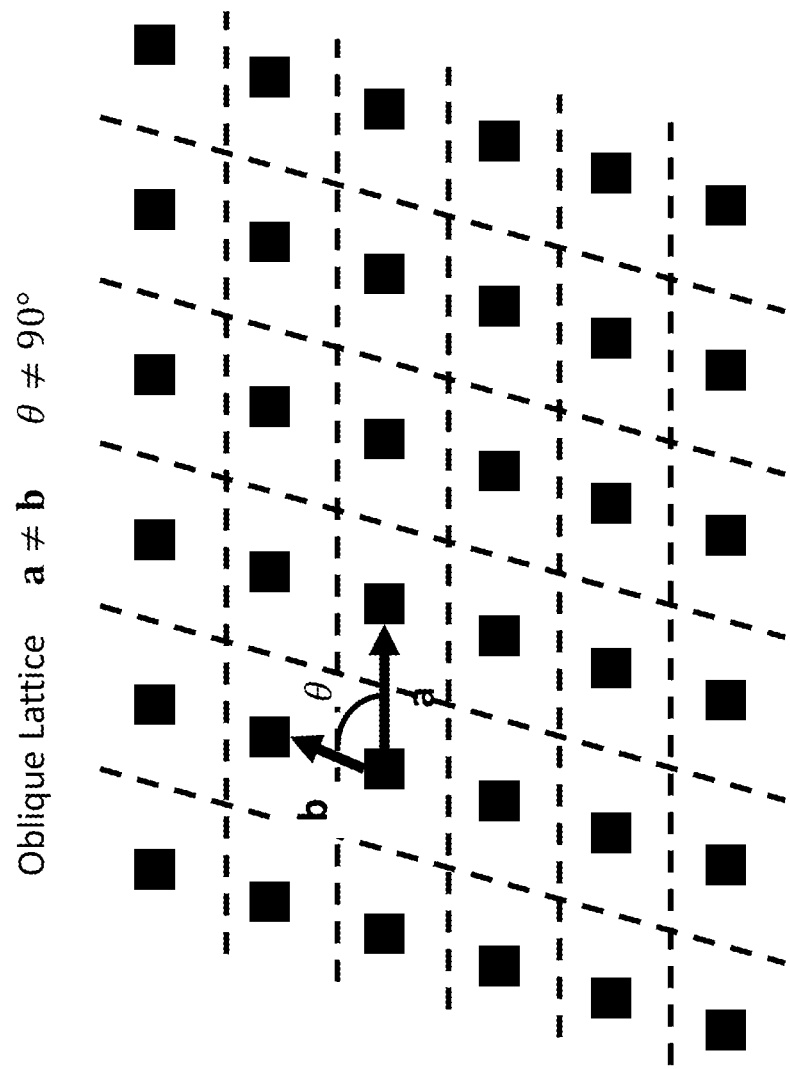
Figure 5J:
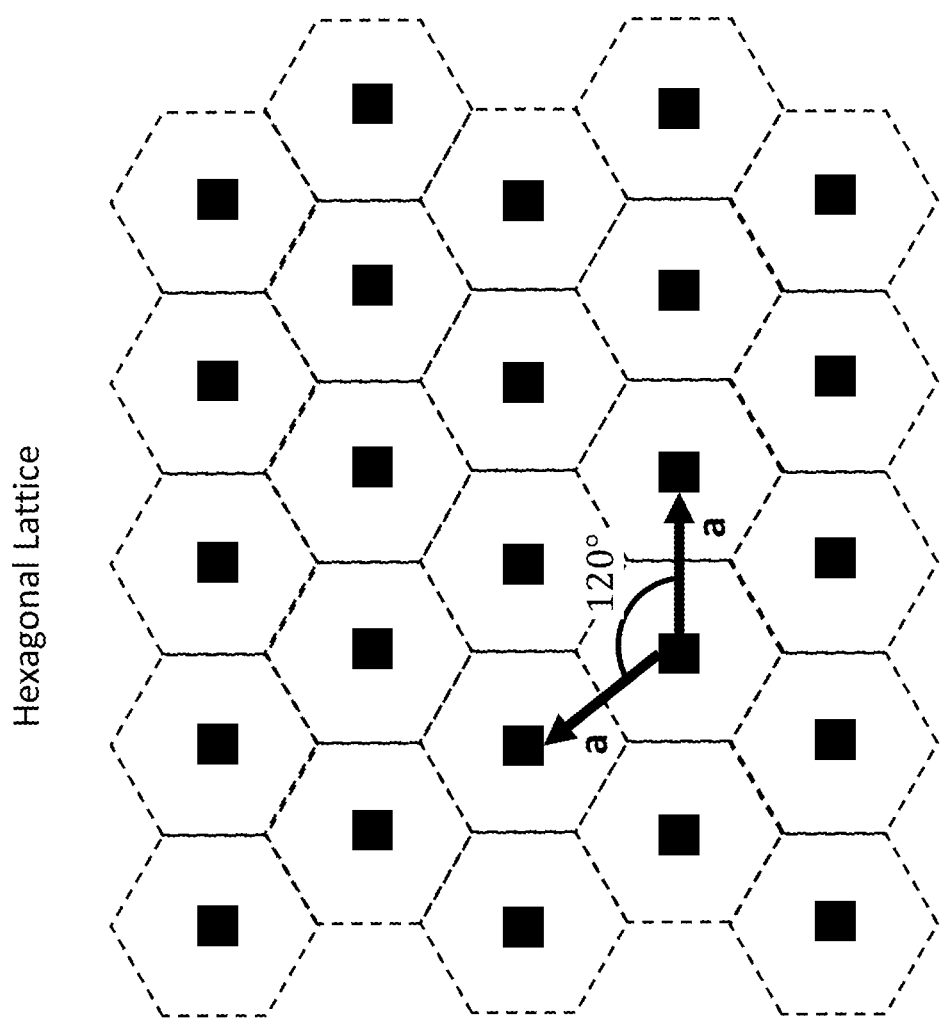

Referring to FIGS. 5D and 5E, together with FIG. 3B, in embodiments of pixelated device 30 of the present disclosure, as further described herein, micro-resonator elements 42 may differ from a first pixel 31 to a second pixel 33 and so on to an nth pixel, in any one or more of size, periodicity, shape, and index of refraction, each pixel configured to transmit a different passband 45 centered around a different center wavelength 55, for example. For example, the first pixel 31 may have micro-resonator elements 42 having a square cross-section as shown in FIG. 5B, or any other shape, with length 91 and width 93 and periodicities 81, 87, and formed of the first material 41 (see FIG. 3B) having the first index of refraction, encapsulated in the second material 37 of the encapsulating layer 44. Any one or more of these parameters characterizing the array may be different in the second pixel 33, which is formed with a second array 54' of micro-resonator elements 42, represented as having, for example, a rectangular cross-section as shown in FIG. 5D, or any other shape, with length 91', width 93' and periodicities 81', 87', and formed of the third material 41' (see FIG. 3B) characterized by the third index of refraction.

In additional embodiments, as best shown in FIG. 4A, the device 30, 40, including each pixel 32 comprised of the unit cells 36, may further include at least one of an upper spacer layer 56 positioned between a top of the encapsulating layer 44 and a bottom of the upper structure 50, and a lower spacer layer 58 positioned between a bottom of the encapsulating layer 44 and a top of the lower structure 52.

In embodiments, the upper spacer layer 56 and the lower spacer layer 58 may be formed of the same materials, and in embodiments, they are formed of different materials.

In embodiments, the device includes both the upper spacer layer 56 and the lower spacer layer 58, with the encapsulating layer 44 being vertically between the upper spacer layer 56 and lower spacer layer 58.

In embodiments, at least one of the upper spacer layer 56 and the lower spacer layer 58 is composed of the same material 37 (see FIG. 5A) as the encapsulating layer 44.

In embodiments, the material of the encapsulating layer 44 may fill the gap layer 39 between the upper structure 50 and the lower structure 52, so that in embodiments having an upper spacer layer 56 and/or lower spacer layer 58, the upper spacer layer 56 and/or lower spacer layer 58 are also formed of the same material as the encapsulating layer 44.

The periodic array 54 of micro-resonators 42 in the encapsulating layer 44 may be vertically positioned anywhere within the gap layer 39, including adjacent to, or positioned on, either of the upper structure 50 or the lower structure 52, or between the upper structure 50 and the lower structure 52.

In embodiments, any one or more of the encapsulating layer 44, the upper spacer layer 56, and the lower spacer layer 58 may be formed from semiconductors, oxides, nitrides, oxynitrides, sulfides, selenides, metals, glasses, and/or some other primarily transparent material(s); examples of such materials include but are not limited to: silicon, silicon nitride, silicon dioxide, titanium dioxide, aluminum oxide, diamond, germanium, zinc sulfide, zinc selenide, spin-on glass (hydrogen silsesquioxane), air, or vacuum. Metals such as aluminum, copper or gold can also be used within the layers to achieve the intended spectral response.

In embodiments, referring to FIG. 5, the thickness 60, referred to as $t_{spac}$, of the encapsulating layer 44 can be a value within a broad range, from as small as $t_{spac}=0.02\lambda$ to $t_{spac}=20\lambda$ where $\lambda$, in embodiments, is the center wavelength 55 ($\lambda_c$), i.e. $t_{spac}=0.02\lambda_c \rightarrow 20\lambda_c$.

In embodiments, the center wavelength 55 may be in a range of 100 nm to 50 μm.

Referring also to FIG. 8A, the unique geometry of the device of the present disclosure, as further described herein, allows each pixel 32 to be tuned to achieve a passband 45 of wavelengths that is narrow, i.e., less than 1% of the center wavelength 55, within the stopband 65 defined by the highly reflective structure 51, e.g., upper structure 50 and/or the lower structure 52, with a low dependence on the AoI. The upper structure 50 and/or the lower structure 52 are preferably configured to form the stopband 65 to extend between a predetermined short wavelength cutoff 63 and a predetermined long wavelength cutoff 67, with the passband 45 falling within the bounds of the stopband 65. The stopband 65 may be flanked by highly transmissive bands 47, as shown in FIG. 8A.

Upper structure 50 and/or the lower structure 52, in embodiments, include a stack of films, for example, dielectric, glass, or semiconductor films, and configured to form a distributed Bragg reflector (DBR), also known as a Bragg stack. Although DBRs have been used in the prior art to perform complex optical filtering, including narrow bandwidth filtering, the filtering performance of the DBRs of the prior art is dependent on the AoI of the incident beam. Furthermore, the center wavelength of a passband cannot be changed in a practical manner from one area to another through a monolithic chip consisting of DBR filters. The periodic array 54 of micro-resonators 42 forming the encapsulating layer 44 of the device of the present disclosure, in contrast, is used to tune the passband 45, while achieving low AoI dependence. Furthermore, the geometry of the periodic array 54 allows the generation of a plurality 35 of pixels 32, which may be arranged in a one-dimensional or two-dimensional array, in embodiments, on a single chip, each pixel 32 being tuned to provide a different filtering function, providing unique and advantageous characteristics of the device over prior art DBR and other optical filters.

Referring to FIGS. 4A and 5A, for example, the upper structure 50 and/or lower structure 52 of the present disclosure may be a DBR structure formed of alternating layers of a high refractive index material 24 and a low refractive index material 26. The layers with a high refractive index 24 (also referred to herein as a HRIL layer 24) have an index of refraction that is larger than the index of refraction of the layers with low refractive index 26 (also referred to herein as a LRIL layer 26). In embodiments, the HRILs 24 may be composed of semiconductors, oxides, nitrides, oxynitrides, sulfides, selenides, glasses and/or some other substantially transparent material, such as, but not limited to, silicon nitride, silicon dioxide, titanium dioxide, aluminum oxide, diamond, zinc sulfide, zinc selenide, or spin-on glass (hydrogen silsesquioxane). The HRIL layers 24 in one DBR do not have to all be formed of the same material or the same thickness.

In embodiments, the LRIL layers 26 may be composed of semiconductors, oxides, nitrides, oxynitrides, sulfides, selenides, glasses and/or some other substantially transparent material(s), including, but not limited to, silicon, silicon nitride, germanium, silicon dioxide, or spin-on glass (hydrogen silsesquioxane). The LRIL layers 26 do not have to all be of the same material or the same thickness.

The HRIL 24 and LRIL layers 26, in embodiments, each has an approximate thickness of $t=\lambda/(4n)$ where n is the index of refraction of the material, and A is within the desired stopband 65 of the device, and may be approximately in the center of the wavelength range of the stopband 65, or at another wavelength within the stopband 65 selected to coincide with the desired operation of the device. In embodiments, the wavelength A for calculating the stopband 65 for forming a device of the present disclosure is selected from within a range of 100 nm to 50 μm.

In further embodiments, the thickness t of each layer in the DBR may also be calculated as approximately $(2m+1)\lambda/(4n)$ where m=0, 1, 2, 3, . . . , namely m is any integer greater than or equal to zero. These thickness values are approximate and deviations from these calculated thickness values of up to 25% of their value are within the scope of this invention.

The micro-resonator elements 42 in the array 54 of the device of the present disclosure may be formed, in embodiments, of a dielectric, glass, or semiconductor material, and are shaped and spaced in the array 54 in a predetermined manner to interact with the incident beam 38, and with the effects of the upper 50 and/or lower structures 52, to create a narrow passband with the center-wavelength 55 $\lambda_c$ of the passband 45 while being largely independent of the AoI of the incident beam 38. The micro-resonators 42 of different pixels 32 of a device of the present disclosure are structured and arrayed to yield different narrow passbands with different $\lambda_c$ values as dictated by the desired use or application of the device.

In various embodiments, each of the micro-resonators 42 may be in the shape of a rectangle, square, cylinder, hexagon, L-shape, bowtie, or cone, for example. In other embodiments, each of the micro-resonators 42 may be constructed from long wires of material, positioned horizontally in the encapsulating layer 44, of any cross-sectional shape, e.g., rectangular cross-section, wherein the wires repeat in one lateral direction (namely, a one-dimensionally periodic array). For one-dimensionally periodic arrays, the wires may have cross-sectional shapes that include, but are not limited to: rectangular, square, semi-circular, trigonal, hexagonal, pentagonal, or some other shape.

In other embodiments, the micro-resonators 42 can be formed from cylindrical or some other shaped structures that repeat on the periodic array 54, or in accordance with the periodic array 54 of the unit cells 36, in two lateral directions (namely, a two-dimensionally periodic array). For two-dimensionally periodic arrays, the structures can have shapes that include, but are not limited to: rectangles, squares, hexagons, pentagons, triangles, cylinders, or cones, e.g.

The micro-resonators 42 may be composed of semiconductors, oxides, nitrides, sulfides, selenides, metals and/or glasses.

In other embodiments, the periodic array 54 of micro-resonators 42 may be in the form of thin metallic films, a periodic array of metallic or dielectric sub-wavelength apertures, a quarter wavelength transformer, photonic crystals, plasmonic crystals, surface plasmon generating structures or a transmission inhibiting film.

In further embodiments, referring to FIG. 5C, a width 93, height 89, and length 91 of the micro-resonators 42 can be from 0.02λ to 5λ, where λ is a wavelength approximately in the center of the wavelength range of the stopband 65 (or of the desired wavelength range of operation of the device), or, in embodiments, another wavelength within the stopband 65 of the radiation filter that provides the desired wavelength range for which the device is to operate. In embodiments, the wavelength λ for calculating the dimensions of the micro-resonators is in a range of 100 nm to 50 μm.

Referring again to FIG. 4A, for example, in embodiments of the device of the present disclosure, the highly reflective structure 51 includes both the upper structure 50 and the lower structure 52 being layered DBR structures. The construction of each one of the two layered DBR structures forming the upper structure 50 and the lower structure 52 may be designed to inhibit transmission of optical or infrared radiation through the structure in accordance with methods well-known in the prior art. It is well known, for example, that alternating films of two materials with different indices of refraction n can yield an anti-transmitting film, namely a film that inhibits the transmission of light for a range of frequencies (or wavelengths). To produce an anti-transmitting property, the thickness of the two layers should be approximately:

$$t_s = \left(p - \frac{1}{2}\right)\frac{\lambda_o}{2n_s} \quad \text{(Eq. 1)}$$

where s=1,2 corresponding to the two films, $n_1$ is the index of refraction of the one set of the films (composed of Material 1), and $n_2$ is the index of refraction of the other set of the films (composed of Material 2), p=1, 2, 3 . . . , and $\lambda_o$ is the wavelength at the approximate spectral center of the stopband 65. Typically, p is chosen to be equal to 1 to produce the desired anti-transmitting property while also being as thin as possible (having p=2 or 3 would require the deposition of thicker films). As one of skill in the art will appreciate, there is some freedom when choosing the value of $\lambda_o$, in that it should be near the spectral center of the desired stopband 65, but does not need to be exactly at the center. To make a more effective anti-transmitting DBR structure, an additional layer is preferably added to the structure so that the stack of films starts and stops with films composed of the same material.

Figure 6A:
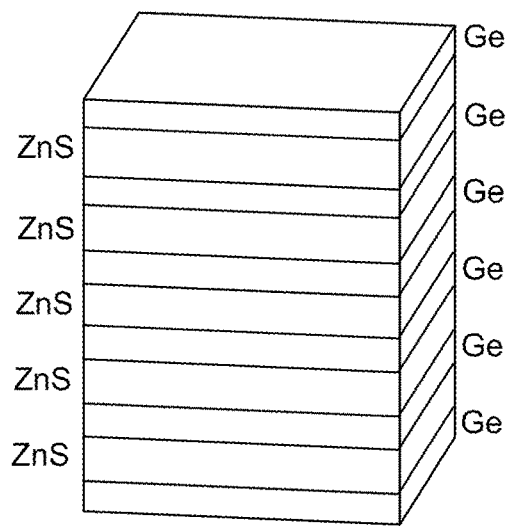
FIGS. 6A and 6B are schematic representations of a five-pair distributed bragg reflector (DBR) structure and a one-pair DBR structure, respectively, each formed of high-index/low-index films and having an additional layer, as known in the art.
Figure 6B:
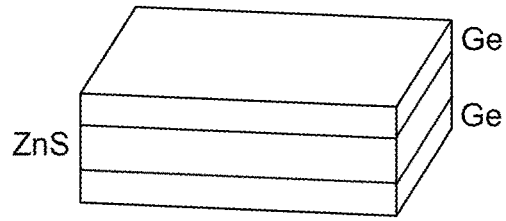

An important property of DBRs is that the comprehensiveness, or effectiveness across the stopband, of its anti-transmitting behavior increases as the number of film pairs (high index/low index) within the stack increases. An example of this behavior is shown in the transmittance curves of FIG. 7, for the five-pair and one-pair (plus on additional layer) DBR examples of FIGS. 6A and 6B, respectively. The films of FIGS. 6A and 6B are composed of germanium (Ge) and zinc sulfide (ZnS) with indices of refraction at a wavelength of $\lambda_o$=4.188 μm of approximately $n_{Ge}$=4.21 and $n_{ZnS}$=2.24. Using Eq. 1, the thicknesses of the layers are approximately $t_{Ge}$=0.249 μm and $t_{ZnS}$=0.467 μm. As further described herein, this property of DBRs may be exploited to reduce the bandwidth of the passband 45 of the device of the present disclosure.

FIG. 9A represents a prior art device for comparison to the devices of the present disclosure. It is known in the prior art to form a narrow passband filter using two separate DBR stacks 60, 62 separated by a gap 64 that is filled with some material (dielectric, glass, or semiconductor). To generate a narrow passband having a center wavelength $\lambda_c$ somewhere within the stopband stacks 60, 62, the gap 64 between the upper 60 and lower stacks 62 (formed as DBRs) has a thickness 66 defined by:

$$t_{gap} = p\frac{\lambda_c}{2n_{qap}} \quad \text{(Eq. 2)}$$

where the subscript gap corresponds to the gap 64 filled with some material with an index of refraction $n_{gap}$, and p=1, 2, 3 . . . , where $\lambda_c$ is the center wavelength of the desired passband for normal (90°) incident light. Such a structure is easy to design (compared with the device of the present disclosure), inexpensive to fabricate, and can achieve narrow passbands.

However, the prior art DBR filter of FIG. 9A has two important drawbacks. First, unless more expensive and complex fabrication steps are performed, $t_{rap}$ is a largely fixed value across the lateral extent of the filter, such that the center wavelength and width of the passband is constant across the filter. This property makes it very difficult to create a pixelated filter where each pixel filters different wavelengths of radiation. Second, the DBR filter described in reference to FIG. 9A exhibits strong dispersion. For a fixed thickness $t_{rap}$, Eq. 2 predicts that the wavelength, or central wavelength at normal incidence, of the passband is:

$$\lambda_{passband} = \frac{2n_{qap}}{p}t_{gap} \quad \text{(Eq. 3)}$$

Figure 10:
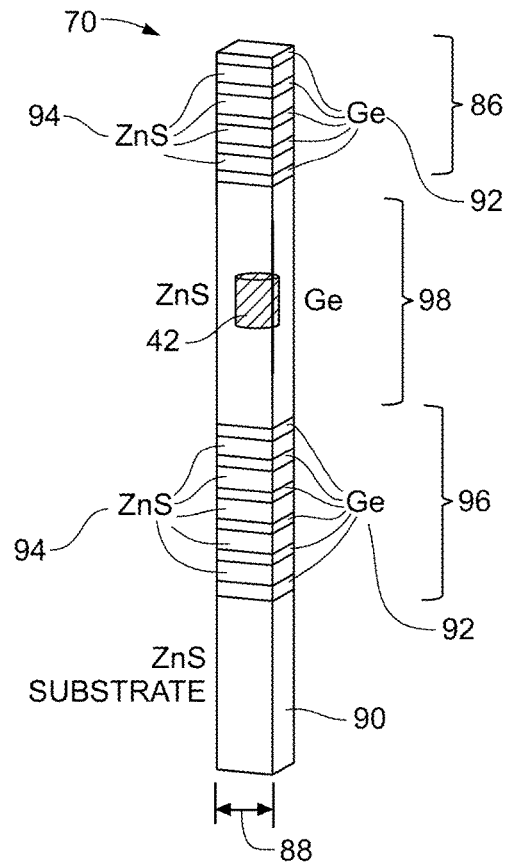
FIG. 10 is a pictorial representation of an embodiment of the unit cell of a pixel of a device of the present disclosure, wherein the encapsulating layer includes a micro-resonator element having a cylindrical geometry, i.e., a circular cross-section, and formed of Germanium ("Ge").

That is, Eq. 3 is true only for normal incidence of radiation. In other words, the wavelength of the transmitted light is dependent on the AoI of the incident light as shown in FIG. 10, a property known as dispersion. This drawback is extremely important because a sensing or imaging system will collect a larger amount of incoming beam by using a collection lens, which focuses the beam to a smaller size for processing by the rest of the system. The prior art DBR filter described here requires that this focused beam be collimated through the prior art DBR filter in order to transmit the desired wavelength. Following the DBR filtering, other lenses may be necessary to further process the light prior to it being incident on the optical receiver (such as a pixelated CCD chip), as described herein in reference to FIG. 1.

The device of the present disclosure solves these problems inherent in conventional DBR filters. It provides a practical (i.e., inexpensive, low complexity, and cost effective) solution to providing a passband device having a center wavelength 55) adjusted from one pixel (or location) to another on the filter. The device of the present disclosure also exhibits substantially lower AoI dependence than the prior art DBR filters.

Figure 9B:
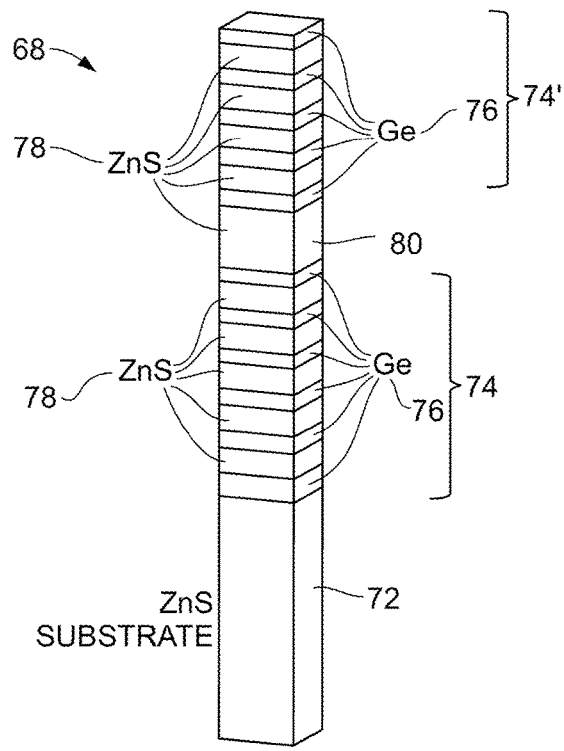
FIG. 9B is a pictorial representation of a unit cell defined for the conventional narrow bandwidth DBR filter of 9A, but having additional pairs of high-index/low-index films, for comparison to embodiments of the present disclosure.

FIG. 9B represents a portion of a prior art DBR filter 68 for comparison to the present disclosure. FIG. 10 represents an embodiment 70 of a unit cell 36 of a pixel 32 of a device of the present disclosure. The plots of transmittance versus wavelength curves for different AoIs, namely θ=0°, 1°, 2°, . . . , 12°, are provided in FIGS. 11A and 11B for the prior art filter 68 of FIG. 9B and a device of the present disclosure formed from the unit cell 70 shown in FIG. 10. The structural components and dimensions of the conventional DBR filter 68 represented in FIG. 9B and the device of the present disclosure represented FIG. 10A are as follows:

Conventional DBR Filter of FIG. 9B: The prior art filter 68 includes 21 thin-film layers on a ZnS substrate 72. Starting from the ZnS substrate 72, there are the following alternating layers of Ge 76 (a high index of refraction layer) and ZnS 78 (a low index of refraction layer, i.e., lower than Ge 76) in order with varying thickness as indicated here, forming a lower DBR structure 74: Ge (279 nm), ZnS (513 nm), Ge (279 nm), ZnS (513 nm), Ge (279 nm), ZnS (513 nm), Ge (279 nm), ZnS (513 nm), Ge (279 nm), ZnS (513 nm), Ge (279 nm). Following these layers of the lower DBR structure 74, there is a thicker ZnS layer of 1,547 nm thickness filling the gap 80 between the DBR structures, 74, 74'. Following this is the upper DBR structure 74' formed of the following alternating layers of Ge 76 and ZnS 78: Ge (279 nm), ZnS (513 nm), Ge (279 nm), ZnS (513 nm), Ge (279 nm), ZnS (513 nm), Ge (279 nm), ZnS (513 nm), Ge (279 nm). The lossless relative permittivities ($\varepsilon_r$) of the Ge and ZnS are taken as $\varepsilon_{r,Ge}$=17.75 and $\varepsilon_{r,ZnS}$=5.024.

Filter Example 1: An embodiment of a device of the present disclosure may include a pixel 32, as represented in FIG. 4A, including a periodic array 34 of unit cells 36 in the encapsulated layer 44, wherein the unit cell 70 is represented in FIG. 10. Referring to both FIG. 4A and FIG. 10, the device includes the lower structure 52, formed as a lower DBR 96, and an upper structure 50, formed as upper DBR 86, with a gap 98 filling the space between the upper 86 and lower DBR 96. The device is formed of 21 thin-film layers, with the lower DBR 96, in embodiments, including alternating layers of Ge 92 and ZnS 94, on a substrate 90 of ZnS. Starting from the ZnS substrate 90, the alternating layers of Ge 92 and ZnS 94 with corresponding thicknesses may form the lower DBR 96 as follows: Ge (279 nm), ZnS (513 nm), Ge (279 nm), ZnS (513 nm), Ge (279 nm), ZnS (513 nm), Ge (279 nm), ZnS (513 nm), Ge (279 nm), ZnS (513 nm), Ge (279 nm).

Following, i.e., above, these layers of the lower DBR structure 96, the gap 98, in embodiments, is significantly thicker, e.g., of 6,340 nm thickness, and is formed as a layer of ZnS. In the embodiment described herein, with reference also to FIG. 5C, the micro-resonator element 42 of the unit cell 70 is a cylindrical Ge structure with diameter 99 of 1000 nm, and a height 89 of 1,200 nm. In embodiments, the periodic array 34 is a square array constructed so that the unit cells 70 repeat with a repeat length and width (periodicity), i.e., the unit cells 70 have a length 88, as well as a width 82, of 1,547 nm, forming the periodic array 54 of micro-resonator elements 42 encapsulated in the layer of ZnS filling the gap 98, i.e., with the encapsulated layer 44, upper spacer layer 56 and lower spacer layer 58 (see FIG. 5A) all being formed of ZnS. The periodic array 54, in embodiments, encapsulated in the encapsulated layer 44 is vertically positioned midway in the gap 98 between the upper 86 and lower DBR structure 96, i.e., the upper distance 83 being the same as the lower distance 84 of the encapsulated layer 44 from the upper 50 and lower structure 52, respectively.

Following the gap 98, i.e., above the gap 98, is the upper structure 50, or upper DBR structure 98, formed of the following alternating layers of Ge, 92 and ZnS 94, in this embodiment: Ge (279 nm), ZnS (513 nm), Ge (279 nm), ZnS (513 nm), Ge (279 nm), ZnS (513 nm), Ge (279 nm), ZnS (513 nm), Ge (279 nm). The lossless relative permittivities ($\varepsilon_r$) of the Ge and ZnS are taken as $\varepsilon_{r,Ge}$=17.75 and $\varepsilon_{r,ZnS}$=5.024.

Figure 11A:
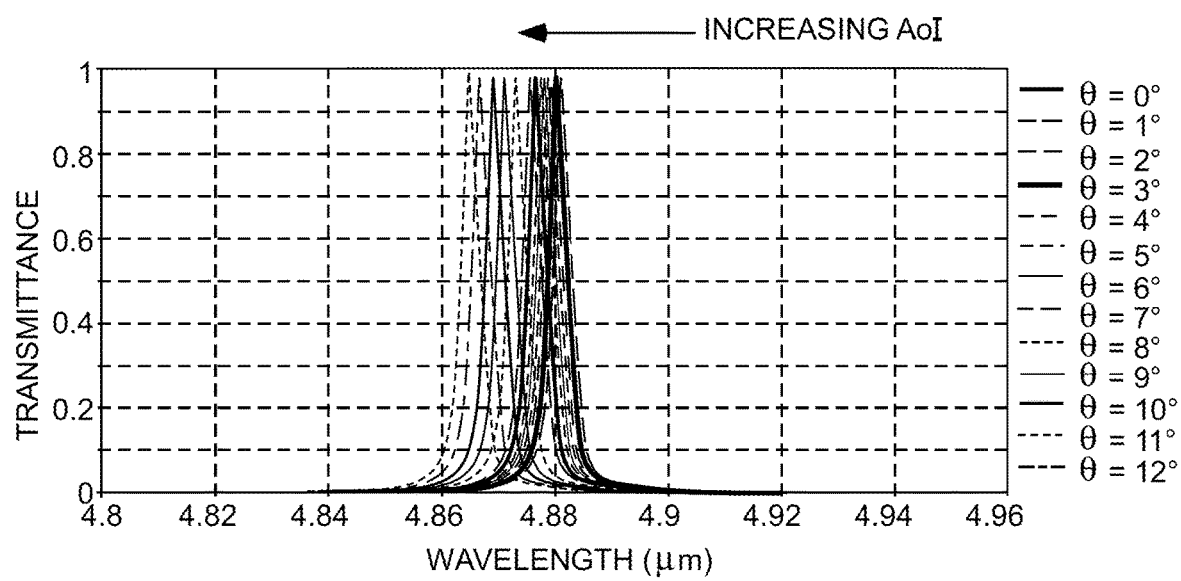
FIG. 11A is a graphical representation of a transmittance of the conventional DBR filter represented by FIGS. 9A and 9B (top) as the angle of incidence ("AoI") is varied from 0° (normal incidence) to 12°, depicting center wavelength $\lambda_c$ of the passband shifting significantly with increasing AoI.
Figure 11B:
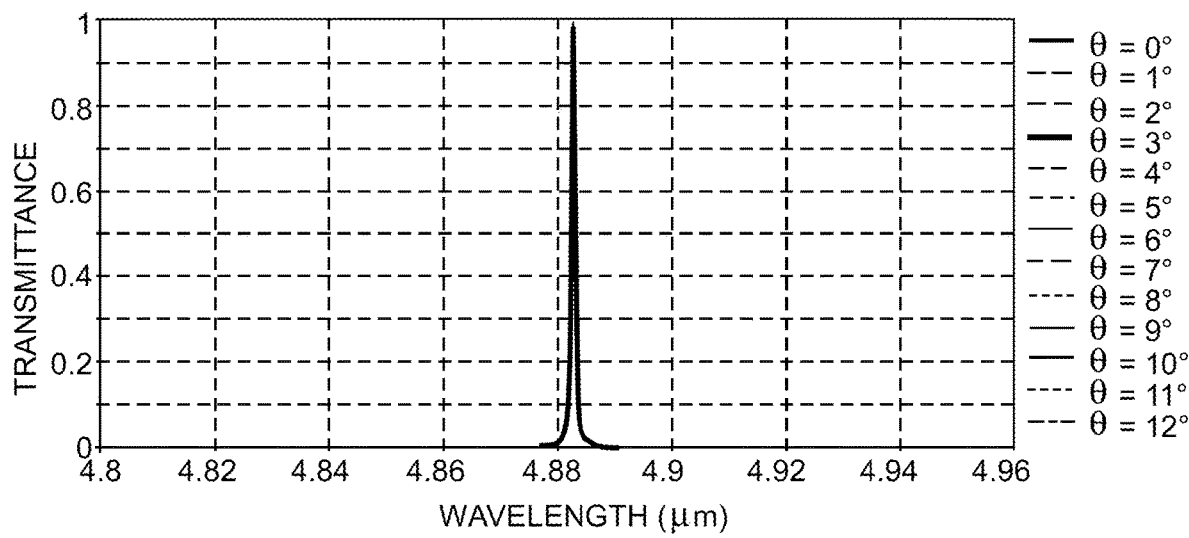
FIG. 11B is a graphical representation of a transmittance of a device, or of a pixel of a device, of the present disclosure represented, by the unit cell of FIG. 10 as the AoI is varied from 0° to 12°. In contrast to the conventional device of FIGS. 9A, 9B, the center wavelength $\lambda_c$ of the passband of the device of the present disclosure remains constant, or substantially constant, over the same range of AoI.

As seen in a comparison of the transmittance plots as a function of AoI for the prior art device 68 of FIG. 9B (FIG. 11A) and an embodiment of a device of the present disclosure represented by the unit cell 70 of FIG. 10 (FIG. 11B) the AoI dependence of $\lambda_c$ of the device of the present disclosure is largely eliminated for AoI of values 0°→12°, as shown in FIG. 11B. In contrast, the AoI dependence of $\lambda_c$, as shown in FIG. 11A, for the prior art dual DBR structure 68 of FIG. 9B is large, making it necessary to employ collimating optics. Accordingly, a narrow passband filter is achieved with the device of Example 1, that is centered around center wavelength 55 of 4.88 µm and having a bandwidth of less than 1% of the center wavelength, with a high transmission, and where the dependence of the transmitted center wavelength 55 on the AoI is largely eliminated, e.g., undetectable.

The key innovation that enables the AoI-independent filtering function of the devices of the present disclosure is the array 54 of micro-resonator elements 42, which are typically characterized by a sub-wavelength geometry, and which can be tailored to provide predetermined filtering characteristics by proper configuration of size, shape, material, and arrangement (lattice type, period, and structural dimensions) of the micro-resonator elements 42 as described herein, in addition to AoI-independence over a predetermined range of AoI. Referring again to FIGS. 4A and 5A, as well as FIGS. 5C, any one or more of the size, e.g., length 91 and width 93, or diameter 99, and shape of the micro-resonator elements 42, as well as the material of the micro-resonator elements 42 and of the encapsulating layer 44, and the periodicity 81, 87 along each of the x-axis and y-axis of the array 54 of micro-resonators, and the lattice type of the array (rectangular, square, circular, etc.) can each be adjusted to define the center wavelength 55 and bandwidth 53 of the passband 45 of a pixel 32, and to achieve a passband that is independent over a predetermined range of AoI for the passband 45 and center wavelength 55 of the pixel. In addition, these parameters can be varied from one pixel 31 to another adjacent pixel 33 to shift the passband 45 and center wavelength 55, while maintaining the AoI independence. Accordingly, a pixelated device 30 can be easily achieved.

Figure 13:
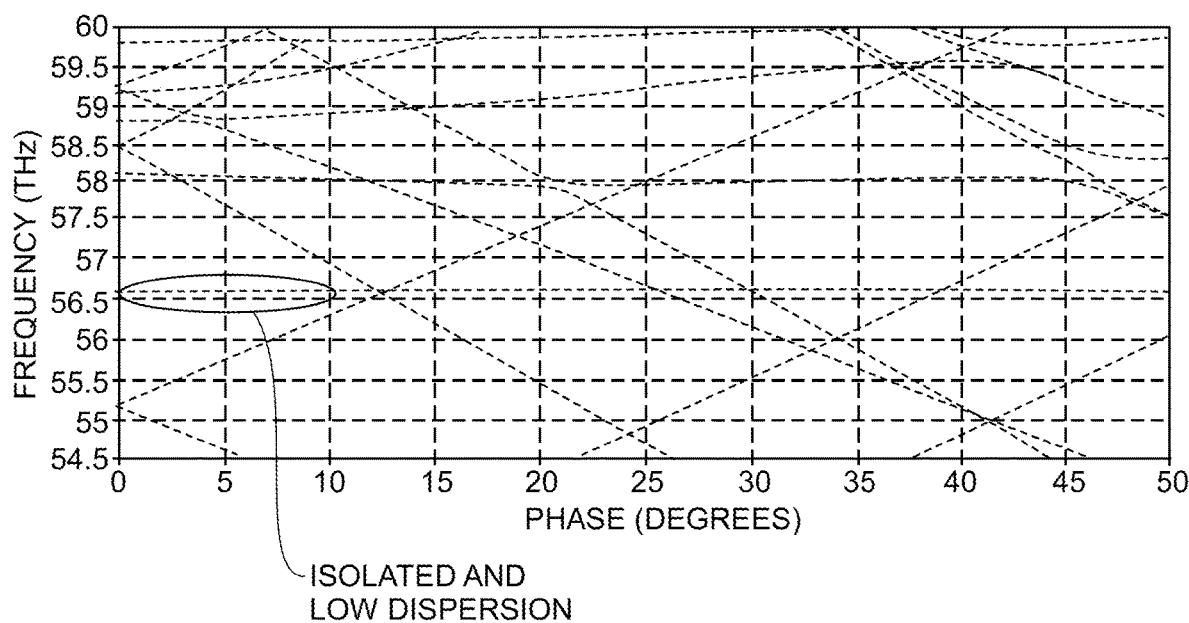
FIG. 13 is a graphical representation of a dispersion curve for the unit cell of FIG. 12, showing an optical band (circled) which is isolated from other bands and is flat, indicating that a resonant mode supported by the SWG of the micro-resonator element of the unit cell has the same (or approximately the same) frequency, or center wavelength, as the angle of the incident beam varies from 0° to larger values.

Additional parameters that may be tweaked to obtain the desired performance include the thickness and material of the upper 56 and lower spacer layers 58, and the vertical positioning of the micro-resonators 42 within the gap layer 39, e.g., the upper distance 83 and/or the lower distance 84 of the micro-resonators 42 from the upper structure 50 (distance 83) and/or the lower structure 52, respectively. These parameters may be carefully tuned in accordance with the present disclosure to provide AoI independence over the predetermined range of AoI for each of the passbands 45 that the device is intended to transmit. The AoI independence may be tuned, for example, by applying dispersion engineering techniques. A dispersion curve (frequency f versus in-plane photon momentum $k_x$) is shown in FIG. 13 for an embodiment of the present disclosure described below as Filter Example 2.

There are a wide range of structures with different materials, and structural features and geometries that can be designed to exhibit low dispersion in accordance with the present disclosure. For example, in another exemplary embodiment of the device of the present disclosure further described below as "Filter Example 2," the micro-resonator element 44 of the unit cell 100 is a cylindrical Ge structure, and the array 34 on which the unit cells 100, and thus the micro-resonator elements 44, are arranged is rectangular, with a repeat length 88 (periodicity) of 1,620 nm in the x direction and width 82 in the y direction of 1,980 nm. Each of the cylindrical Ge structures, in this particular embodiment, has a diameter 99 of 1300 nm and height 89 of 1,123 nm. As seen in FIG. 13, and as further described below, for this structure there is a range of frequency values and $k_x$ values for which the optical energy band is almost flat. This range of $k_x$ values are associated with a range of AoIs, namely, θ=0°→12°.

Figure 12:
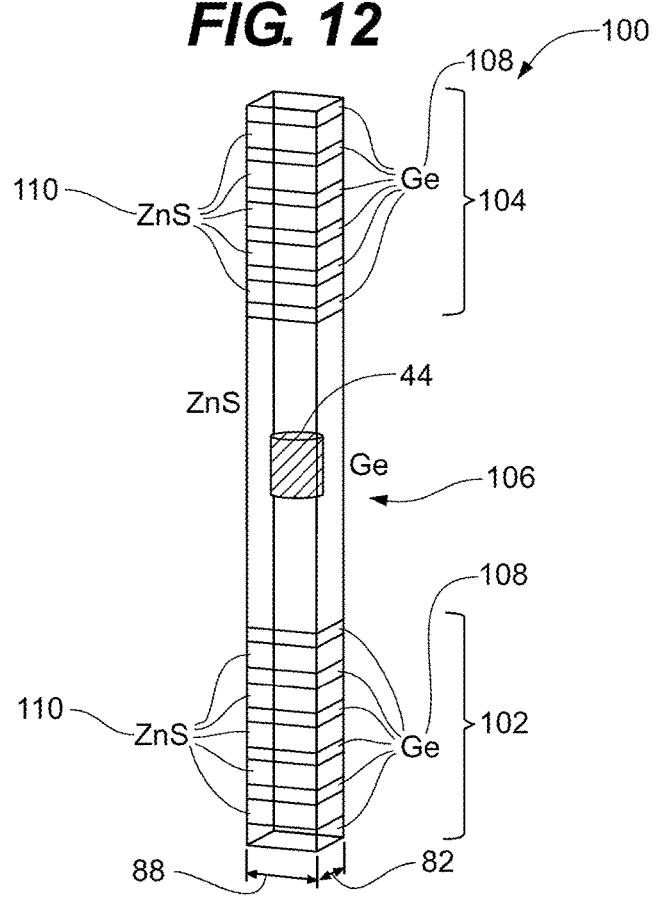
FIG. 12 is a pictorial representation of another embodiment of a unit cell of a pixel of a device of the present disclosure, wherein the encapsulating layer includes a micro-resonator element having a cylindrical geometry, and formed of Germanium ("Ge").

Filter Example 2: Another embodiment of a device of the present disclosure may include a pixel 32, as represented in FIG. 4A, including a periodic array 34 of unit cells 36 in the encapsulated layer 44, wherein the unit cell 100 is represented in FIG. 12. Referring to both FIG. 4A, 5A, as well as to FIG. 12, the device includes 23 thin-film layers, with the lower structure 52, formed as a lower DBR 102 and an upper structure 50, formed as upper DBR 104, with a gap layer 106 filling the space between the upper 104 and lower DBR 102. Starting from the semi-infinite bottom layer (vacuum), the lower DBR 102, in embodiments, is formed of alternating layers of Ge 108 and ZnS 110 with corresponding thickness as listed and in the following order: Ge (279 nm), ZnS (513 nm), Ge (279 nm), ZnS (513 nm), Ge (279 nm), ZnS (513 nm), Ge (279 nm), ZnS (513 nm), Ge (279 nm), ZnS (513 nm), Ge (279 nm). Following these layers of the lower DBR structure 102, there is the gap layer 106 of ZnS, with 2,256 nm thickness. In this embodiment, the upper spacer layer 56 and lower spacer layer 58 are formed of the same material, ZnS, that encapsulates the micro-resonators 42 in the encapsulated layer 44, the upper spacer layer 56, lower spacer layer 58, and encapsulated layer 44 together forming the gap layer 106. The array 54 of micro-resonators 42 is vertically centered in the gap layer 106, i.e., such that the upper distance 83 of the micro-resonator 42 from the upper structure 50 is equal to the lower distance 84 from the lower structure 52 (see FIG. 5A). The array 34, 54 on which the unit cells 100 and micro-resonator elements 44, respectively, are arranged is, in this embodiment, rectangular, with a repeat length 88 (periodicity) of 1,620 nm in the x direction and repeat width 82 (periodicity) in the y direction of 1,980 nm (see FIG. 5B, e.g.). The micro-resonator element 44 is a cylindrical Ge structure, in this particular embodiment, having a diameter 99 of 1300 nm and a height 89 of 1,123 nm.

Following, i.e., above the gap layer 106, the upper DBR structure 104, in embodiments, is constructed of alternating layers of Ge 108 and ZnS 110 with corresponding thickness in the following order upward from the gap layer 106: Ge (279 nm), ZnS (513 nm), Ge (279 nm), ZnS (513 nm), Ge (279 nm), ZnS (513 nm), Ge (279 nm), ZnS (513 nm), Ge (279 nm), ZnS (513 nm), Ge (279 nm). The lossless relative permittivities ($\varepsilon_r$) of the Ge and ZnS are taken as $\varepsilon_{r,Ge}$=17.75 and $\varepsilon_{r,ZnS}$=5.024.

Like the device of Example 1, this configuration also produced a narrow passband filter centered around center wavelength 55 of 4.88 μm and having a bandwidth of less than 1% of the center wavelength, with a high transmission, and where the dependence of the transmitted center wavelength 55 on the AoI is largely eliminated, e.g., undetectable. The measured transmission curve is shown in FIG. 11A.

The best mode contemplated by the inventors include the upper and lower DBR structures with the encapsulating resonant layer 44 between them, as represented and described in the two examples provided above, formed of highly transmissive materials over the desired operating wavelength range of the device. The encapsulating resonant layer 44 may be formed with the array 54 of micro-resonator elements 42 being a two-dimensionally periodic array of micro-resonator elements 42 selected from one of cylinders, hexagonal prisms, rectangular prisms, or other-shaped structures. Possible configurations of the top and bottom DBRs include, but are not limited to: the top DBR with a varying number of alternating layers HRIL, LRIL, HRIL, LRIL [ . . . ], and the bottom DBR with a varying number of alternating layers HRIL, LRIL, HRIL, LRIL [ . . . ]; or, the top DBR with a varying number of alternating layers HRIL, LRIL, HRIL, LRIL [ . . . ], and the bottom DBR with a varying number of alternating layers LRIL, HRIL, LRIL, HRIL [ . . . ]; or, the top DBR with a varying number of alternating layers LRIL, HRIL, LRIL, HRIL [ . . . ], and the bottom DBR with a varying number of alternating layers LRIL, HRIL, LRIL, HRIL [ . . . ]; or, the top DBR with a varying number of alternating layers LRIL, HRIL, LRIL, HRIL [ . . . ], and the bottom DBR with a varying number of alternating layers HRIL, LRIL, HRIL, LRIL [ . . . ].

The materials used for the DBR layers, as well as for the encapsulating layer 44 and upper and lower spacer layers, may include, but are not limited to semiconductors, oxides, nitrides, sulfides, selenides, glasses such as silicon, silicon nitride, silicon dioxide, titanium dioxide, aluminum oxide, diamond, germanium, zinc sulfide, zinc selenide, spin-on glass (hydrogen silsesquioxane) and similar materials. Metals such as gold, copper, aluminum, silver, chromium, and nickel can also be used in conjunction with the semiconductor/dielectric materials. The thicknesses of the layers within the DBRs, the thickness of the spacer layers, and the width, length, and height of the micro-resonant elements 42, are preferably in the range of 0.02λ to 2λ, where λ is the wavelength in the center of the stopband of operation, or approximately at the center of the stopband of the radiation filter at which the device is to operate, and wherein λ may be, in embodiments, in a range of 100 nm to 50 μm.

The device can be made using microfabrication processes similar to those used to fabricate computer chips. The materials in the layers are deposited with fabrication processes that include but are not limited to: physical vapor deposition, plasma enhanced chemical vapor deposition, atomic layer deposition, thermal or electron beam deposition, sputter deposition, spin casting, or some other technique. If the layer is to be patterned into wires, cylinders or some other shapes, then processes that include lithography followed by etching are performed. The lithography process can include, but is not limited to: photolithography, electron beam lithography, imprint lithography; or some other patterning technique such as holographic lithography, shadow masking, liftoff, or others. The etching process can include, but is not limited to: reactive ion etching, inductively coupled plasma etching, ion beam etching, wet chemical etching, dry chemical etching or some other etching technique. Additive manufacturing processes including but not limited to 3D printing may be used either in conjunction with or as an alternative to lithography and etching. To ensure that the DBR layers above the patterned wires are flat, planarization processes may be performed, which may include but are not limited to chemical mechanical polishing, reflow of liquid materials (including but not limited to photoresists, electron beam lithography resists, and others), or other planarization techniques. The device can be fabricated directly on top of a substrate that is transparent in the wavelength range of operation. Substrate materials include but are not limited to: silicon, silicon nitride, silicon dioxide, titanium dioxide, aluminum oxide, diamond, germanium, zinc sulfide, and zinc selenide.

As further described in Methodology below, a device and method of the present disclosure includes spectrally shifting the center wavelength 55 of the passband 45 as a function of the physical dimensions of the micro-resonant elements 42 and/or the refractive index of the material forming the micro-resonator elements 42, and the material encapsulating the micro-resonator elements 42 in the encapsulating layer 44. As shown in FIG. 14, the inventors have found that by decreasing a size of the micro-resonant elements 42 in the encapsulating layer 44 of a particular array 54, the center wavelength 55 and passband 45 can be shifted to a lower value. In addition, the bandwidth of the passband can be dialed-in (i.e., engineered-in) during the design process to allow bandwidths that vary from 0.01% to 1% of the center wavelength 55 as measured from the full width half maximum values of the passband, while maintaining an insensitivity of the passband to the AoI of incoming beam of radiation. For example, the bandwidth of the passband 45 can be decreased by increasing the number of pairs of alternating HRIL/LRIL layers in the upper 50 and/or lower structures, 52, e.g., reflective Bragg stacks. Additionally, the bandwidth of the passband 45 of a particular pixel 32 may be tailored by the choice of material 41 used for the micro-resonator 42, the upper distance 83 and/or lower distance 84 between the upper structure 50 and/or lower structure 52 and the micro-resonators 42, and other geometric parameters of the device.

Figure 3A:
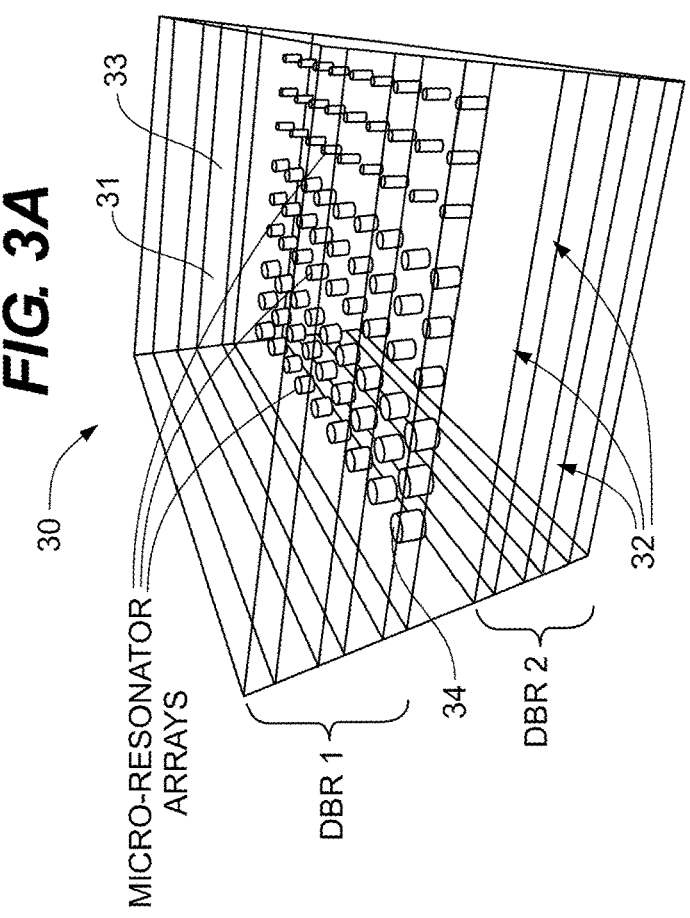
FIG. 3A is a perspective (3D) representation of three pixels of an embodiment of a device of the present disclosure, each pixel configured with an encapsulated layer including an array of micro-resonator elements having a shape, size, and spatial arrangement configured to transmit a passband of an incident beam around a different center wavelength.

Referring again to FIG. 14, together with FIGS. 3A and 3B, FIG. 14 depicts a plurality of passbands 45, each centered around a different center wavelength ($\lambda_{c1}$), corresponding to a device including an array 54 of micro-resonant elements 42 of different physical sizes. FIG. 14 shows that the passband 45 for a particular pixel 32 can be tuned or shifted to shorter wavelengths by decreasing the size (length 88 and/or width 82) of the micro-resonant elements 42. FIG. 14 also shows that this characteristic allows an embodiment of a device 30, for example, of the present disclosure, which includes the plurality 35 of pixels 32, to transmit a plurality 49 of passbands 45 having center wavelengths 55 that are separate and distinct from neighboring pixels, by increasing the size of the micro-resonators 42 from a first pixel 31 to a second pixel 32 and so on to an nth pixel (see also FIG. 3A, 3B). Referring still to FIG. 14, when the size of micro-resonators 42 is gradually decreased, the passband 45, will spectrally shift to shorter wavelengths. For example, in embodiments, the center wavelength 491 is longest for the first pixel 31 of a pixelated device 30 having the largest sized (length 88 and/or width 82) of the micro-resonators 42 of the device, while the nth pixel 32 including micro-resonators 42 of the smallest size in the plurality 35 of pixels 32 transmits a passband 45 having the shortest center wavelength 492 of the device.

Figure 15:
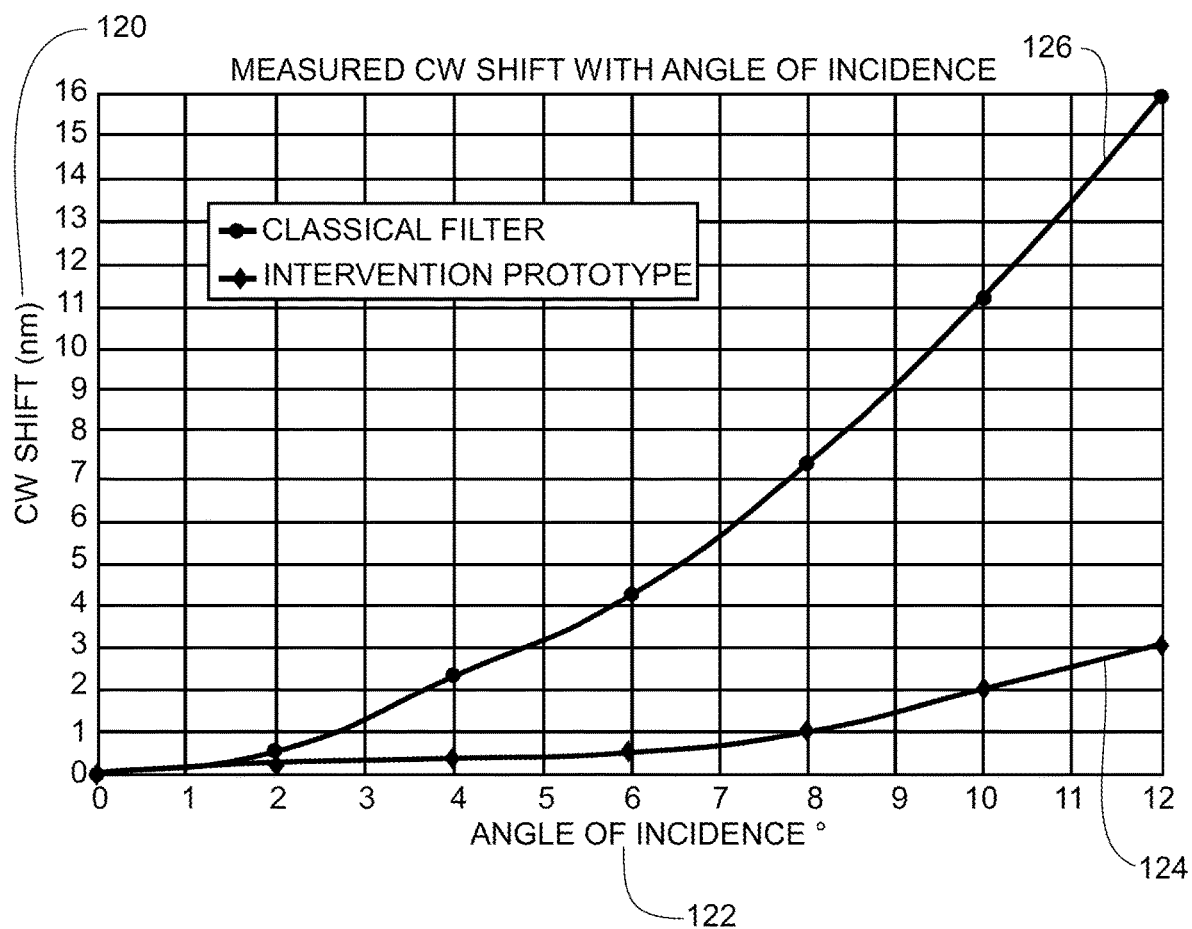
FIG. 15 is a graphical representation of the AoI independence of the device of the present disclosure.

FIG. 15 shows a plot 124 of measured, actual, spectral dispersion, i.e., of a shift 120 of the center wavelength 55 of the passband 45 of a device of the present disclosure 124 as a function of AoI 122 of incident radiation. The particular structure measured was identical to the Filter Example 1, described above, but with different size and periodicity of the micro-resonators 42, namely, a diameter of 980 nm and periodicity of 1.558 micrometers. For comparison, a plot 126 is provided, from theoretical calculations, of the shift 120 of the center wavelength of the passband of a conventional spectral passband filter as a function of the AoI 122. The device of the present disclosure exhibits a shift over the 12 degree AoI of only 3 nm, in comparison to a 16 nm shift exhibited by the prior art device, an improvement of over 5×.

The totality of a particular structure forming an embodiment of a device of the present disclosure imbues it with the optical property of AoI-independent narrow bandwidth filtering over the bandwidth 43 of the passband 45 centered around the center wavelength 55, and for a predetermined range of angles of incidence. The materials used in the various layers of the device may include semiconductor, insulator, glass, dielectric, plastic, polymer or other materials that are largely transparent at and around the wavelengths at which the filter is to operate. Such materials may include, but are not limited to: silicon, silicon oxide, silicon nitride, germanium, zinc sulfide, silica, glass, quartz, titanium oxide, tantalum oxide, polymer, plastic, and others. The shape of the resonator can also vary depending on the particular requirements of the application, including but not limited to the following shapes: cylinders, rectangles, cube, triangles, L-shaped structures, C-shaped or curved structures, triangles, cones, pentagons, hexagons, or some other N-sided shape, wires of rectangular or saw-tooth profiles, and others.

As demonstrated herein, the gap layer 39 and the array 54 of micro-resonators 42 in the gap layer 39 of the present disclosure may be carefully engineered to work in conjunction with one or two highly reflecting structures, such as DBRs, forming one or both of the upper structure 50 and the lower structure 52 such that the entire device has low or no AoI dependence. Each pixel 32 of a pixelated device of the present disclosure has a high transmission passband 45, of narrow bandwidth, centered around the center wavelength 55. The center wavelength 55 may be shifted from pixel 32 to pixel 32 in a single, pixelated, device by varying one or more of the parameters of the array 54 of micro-resonators 42 in each pixel. Nowhere in the prior art are pixelated filters achieved, which also have low or no AoI dependence over a particular passband and center wavelength. This superior performance is achieved by tuning the discrete micro-resonators and other parameters in the device in accordance with the methods of the present disclosure, which incorporate dispersion engineering as further described below, to provide AoI independent filtering.

Methodology: A cutoff wavelength (or frequency) is the wavelength above which a particular optical mode (sometimes called an eigenmode, resonant mode, from here on just called a mode of the micro-resonant element 42) generally cannot exist. The design of the unit cell 36 for forming a pixel 32 of the present disclosure begins by first determining the eigenmode cutoff wavelength or wavelength of the chosen geometry of the micro-resonator element 42, formed of a particular material, surrounded by (i.e., being encapsulated by) some other desired material to form the encapsulating film or layer 44. This physical size and material composition of the micro-resonator element 42 is chosen such that the cut off wavelength of the mode is a few tenths to multiples of a wavelength away from the center wavelength 55 of the passband 45 at which the device, or one pixel of a pixelated device of the present disclosure, is to operate with a minimal angle-of-incidence dependence and reduced angular dispersion.

Referring, for example, to FIGS. 5A-5C, the cross-sectional shape of the micro-resonator element 42 can be rectangular, square, circular, L-shaped, elliptical, trigonal or some other shape. Any one of a number of these or other shapes can be used as a starting point in the design of the structure. The cross-sectional shape of the micro-resonator element 42 impacts its optical properties, such as the dependence of its filtering properties on the polarization of the incident light, as well as the dispersion properties of the modes supported by the micro-resonator element 42. Because the shape impacts the dispersion of the modes of the micro-resonator element 42, the exact and final shape is converged upon after careful tuning of the shape and structural feature sizes to minimize angle-of-incidence dependence.

The exact dimensions (size) of the micro-resonator elements 42 are chosen such that they can support the mode, an optical mode that can be either a resonant mode, cavity mode, or some other mode, largely residing within the micro-resonator elements 42. The size of the micro-resonator elements 42 are chosen such that one of their lateral dimensions (i.e., in the plane 97 of the layers, referring to FIGS. 5B and 5C, length 91, and width 93, or diameter 99) will typically be smaller than the center wavelength 55 (i.e., sub-wavelength) at which the pixel 32 (or device, in embodiments) is to operate. As one example, a rectangular shaped micro-resonator (see FIGS. 5A-5C) will have one dimension, e.g., a length 91 (or diameter 99 for cylindrical SWGs), that is less than $l=\lambda_o/n_{SWG}$, where $n_{SWG}$ is the index of refraction of the material of which the micro-resonator element 42 is composed. Often, the micro-resonator can be even smaller, approximately equal to $\lambda_o/2n_{SWG}$, or sometimes larger than $\lambda_o/n_{SWG}$. Importantly, the other dimension, i.e., width 93, of the micro-resonator element 42 can also be small, such as with the micro-resonator having a square or circular cross-section. In some cases, the other dimension, i.e., width 93, can be very large, such as with the micro-resonator being a dielectric (or semiconductor) wire oriented in the plane of the encapsulating layer 44.

In some cases, a center wavelength of the mode, corresponding to the center wavelength 55 of the passband 45, may occur at wavelengths greater than the cutoff wavelength, thus the calculation of the cutoff wavelength is only a first estimation of the center wavelength of the mode. The actual center wavelength of the mode is determined by many other factors that are described below.

After determining the starting size and material of the micro-resonator element 42, the center wavelength 55 of the passband 55 may be tuned further by varying the upper distance 83 between the top of the micro-resonant elements 42, and the bottom of the above-lying thin-film layer or upper structure 50 (see FIG. 5A) and/or by varying the lower distance 84 between the bottom of the micro-resonant elements 42 and the top of the below-lying thin-film layer, i.e., lower structure 52 (FIG. 5A). An increase in either one or both these two distances shifts the center wavelength of the resonant mode, generally, but not always, to a larger wavelength, whereas a decrease in one or both of these two distances, generally, but not always, shifts the center wavelength of the mode, e.g., a resonant mode, to a smaller wavelength. These two distances need not be the same and can be varied in either a symmetric or asymmetric fashion. When varying this distance, other propagating and non-propagating modes within the device may also be affected. These modes may be desired or undesired depending on the performance requirements of the device, and typically include near field diffraction, Mie resonances, cavity modes, and or localized DBR modes which may or may not interact with the eigenmode of the SWG structure, e.g., micro-resonant elements 42. By careful adjustment of these two distances, 83, 84, along with adjusting other structural features (i.e., micro-resonator spacing 81 and 87 and other parameters, the presence of undesired modes can be minimized.

Additionally, the center wavelength 55 of the passband 45 can also be adjusted by the use of a different material (with a different optical refractive index) composing the encapsulating layer 44, namely, the layer within which the micro-resonant elements 42 reside.

The material 41 forming the micro-resonator elements 42, e.g., germanium, in the examples provided herein, should have a higher index of refraction than the material, e.g., ZnS, encapsulating the micro-resonator elements 42. Preferably, the material 41 chosen has as high of an index of refraction as possible, and is also primarily transparent (i.e., non-absorptive) for incident light with wavelengths at or near $\lambda_c$, namely, at or around the wavelength of operation of the corresponding pixel of the device. As described herein, the material 41 can be patterned (e.g., etched) using microfabrication techniques known in the art to yield an array of discrete micro-resonators 42.

Since the evanescent field of the mode, e.g., resonant mode, extends beyond the physical boundaries of the micro-resonant element 42, the chosen mode may interact with the same mode residing in the micro-resonant element 42 in an adjacent unit cell. This property, namely interaction between the optical fields of modes in adjacent micro-resonant elements 42, can be used as an additional mechanism to tune the center wavelength mode. In other words, the center wavelength 55 can also be tuned by increasing or decreasing the duty cycle, i.e., the periodicity 81, 87 of the array 54 of micro-resonant elements 42 (see FIG. 5B), as well as the size 91, 93, of the micro-resonant elements 42, and/or a spacing 77, 79 (see FIG. 5B) separating neighboring micro-resonant elements 42. Additionally, increasing or decreasing the duty cycle can also be used to reduce or eliminate the angle-of-incidence of the modes.

For a one-dimensional array 34 of unit cells 36, for example, the spacing 81, i.e., periodicity (P) of the micro-resonators 42 (or for 2-D arrays 34, one or both of the spacing 81, 87 along each of the x- and y-axis) is typically chosen to be on the order of $\lambda_o/n_{spacer}$ where $n_{spacer}$ is the index of refraction of the material of the encapsulating layer 44 that surrounds the micro-resonators 42, with the range of values for P being wide. The minimum value of P is established by the necessity of having adjacent micro-resonators staying well spatially separated from each other, namely, ensuring that neighboring micro-resonators 42 do not merge. There is no well-defined maximum value of P, but it is expected to be approximately $6\lambda_o/n_{spacer}$.

In embodiments, P along the x- and/or y-axis, 81 and/or 87, is at least twice the length 91 and/or width 93 of the micro-resonator element 42.

In embodiments, the spacing 77, 79 between neighboring micro-resonant elements 42, and the dimensions 91, 93 of the micro-resonant elements 42, may be on the order of 10's of nanometers to 10's of centimeters depending on the operating wavelength of the device.

After the initial unit cell design parameters and materials have been chosen to produce the desired center wavelength modal response, tuning of the structure to provide angle-of-incidence independent filtering is performed. This tuning of the dispersion of the modes is performed by adjusting the duty cycle of the array 54 of micro-resonator elements 42. This adjustment does not need to be symmetrical and can take on any lattice shape or type that is feasible for fabrication and is necessary for shaping the angular dispersion of the device to a desired AoI at the center wavelength.

Additionally, tuning of the dispersion curve of the modes is performed by adjusting the shape of the micro-resonator element 42. For example, a design can start with a square shaped micro-resonator and then adjust the width and length of the structure separately to tune the dispersion curve, making for a rectangularly shaped micro-resonator. A second example is to start with a cylinder micro-resonator and adjust the shape to minimize dispersion (over a certain range of a mode's dispersion curve) by elongating or reducing the radius along one direction of the cylinder, making an elliptically shaped micro-resonator. Other examples of this type of tuning are possible.

A typical dispersion curve is shown in FIG. 13. The dispersion curve provides information about the frequencies (associated with wavelength) of the optical modes as a function of phase change from one side of the unit cell to the other (associated with angles of incidence). A zero phase is normal incidence and larger phases represent larger angles of incidence. The important thing to observe is that, if engineered properly, there will be an optical band (circled)

that is isolated from other bands and that is flat—this flatness over a range of $k_x$ values indicates that the mode has the same (or primarily so) frequency as the angle of the incident beam varies from 0° to larger values. This range of $k_x$ values for the device characterized by the dispersion curve of FIG. 13 are associated with a range of AoIs, from $\theta=0°\rightarrow12°$.

The innovation associated with the device, including an MHF device, of the present disclosure is the use of a carefully engineered array of micro-resonators of certain shapes, configurations, and arrangements such that they are tuned to spectrally filter (i.e., transmit) particular wavelength components of the incident beam, with little or no dependence on the AoI of the incident beam. The shapes, configurations, and arrangements of the micro-resonators can vary from one pixel to another such that different pixels will spectrally select and transmit different wavelength components of the incident beam corresponding to spectral emission or absorption of different atomic or chemical species as required by the desired application of the device. To summarize, the main advantages of the device of the present disclosure, include:

1. Bespoke spectral line selection: The device is designed to provide all—and only—the desired spectral passbands of the desired bandwidth centered about wavelengths of importance for a particular application. This feature reduces the computational resources required to process the signals coming from, in embodiments, a hyperspectral imaging (HSI) system.
2. Dispersion-less filtering: The device is designed to perform the optical and infrared filtering functions in a way that can accommodate a range of angles of incidence. This feature reduces the need for collimating optics, thereby reducing the size and weight of the filtering image system.
3. Spectrometer-on-a-chip: The device functions as a spectrometer, but one that is reduced in size similar to that of a computer chip. This eliminates the need for several large, bulky, and vibration intolerant components that are in conventional HSI systems, for example.

The reduction in the size, complexity, required computational resources in turn reduces the manufacturing and operation costs associated with HSI systems that use the MHF. In the engineering community, these parameters are lumped together in one acronym: SWaP-C (Size, Weight and Power, Cost). The reduction of SWaP-C (or any individual parameter) is highly desirable. HSIs that use the device of the present disclosure can significantly reduce all parts of SWaP-C, allowing HSI that incorporates the device of the present disclosure to be used in a wide array of cost-sensitive applications, for applications that require a high degree of portability, and for mounting on small vehicular, aerial, or space-based platforms.

While the invention has been particularly shown and described with reference to specific embodiments, it should be apparent to those skilled in the art that the foregoing is illustrative only and not limiting, having been presented by way of example only. Various changes in form and detail may be made therein without departing from the spirit and scope of the invention. Therefore, numerous other embodiments are contemplated as falling within the scope of the present invention as defined by the accompanying claims and equivalents thereto.

What is claimed is:

1. A device for filtering of incident radiation, comprising:
    an encapsulated layer including an array of micro-resonant elements arranged spatially distinct from each other in a plane, wherein each micro-resonant element is formed of a first material and the array of micro-resonant elements is encapsulated within a second material to form the encapsulated layer, an index of refraction of the first material being higher than that of the second material; and
    a highly reflective filtering structure including at least one of an upper structure positioned a first distance above the encapsulated layer and a lower structure positioned a second distance below the encapsulated layer, wherein the highly reflective filtering structure is characterized by a stopband; and
    wherein the array of micro-resonant elements is configured to transmit a passband of incident radiation centered around a center wavelength, wherein the center wavelength falls within the stopband of the highly reflective filtering structure, and to minimize a dependence of the center wavelength on an angle of incidence of the incident radiation.

2. The device of claim 1, wherein a size of each of the micro-resonant elements along an axis of the array is less than the center wavelength, and wherein each of the micro-resonant elements is configured with the size and a shape and a periodicity on the array to support a mode of each of the micro-resonant elements at the center wavelength, the size and the shape and the periodicity configured to transmit the passband of incident radiation centered around the center wavelength.

3. The device of claim 2, wherein a type of the array of micro-resonant elements is one of a rectangular, square, centered rectangular, oblique, and hexagonal array.

4. The device of claim 2, wherein the periodicity of the array of micro-resonant elements along the axis of the array is configured to minimize the dependence of the center wavelength on the angle of incidence.

5. The device of claim 2, wherein a type of the array, together with the size, the shape and the periodicity, is configured to support the mode of each of the micro-resonant elements at the center wavelength.

6. The device of claim 1, wherein a cross-section of each of the micro-resonant elements in the plane of the encapsulated layer is one of a rectangular, square, hexagonal, pentagonal, triangular, circular, semi-circular, elliptical, and an L shape.

7. The device of claim 1, wherein the center wavelength of the passband is determined at least in part by at least one of the first distance and the second distance of the highly reflective filtering structure from the encapsulated layer.

8. The device of claim 1, wherein the highly reflective filtering structure includes both the upper structure and the lower structure, wherein at least one of the upper structure and the lower structure is a distributed bragg reflector (DBR) structure formed of pairs of alternating layers of high-refractive index and low-refractive index layers.

9. The device of claim 8, wherein the second material of the encapsulated material extends across the second distance below the encapsulated layer and across the first distance above the encapsulated layer and wherein the first distance and the second distance of the encapsulated layer including the array of micro-resonant elements from the upper structure and the lower structure, respectively, are configured to minimize the dependence of the center wavelength on the angle of incidence.

10. The device of claim 8, further comprising an upper spacer layer positioned between the upper structure and the encapsulated layer and a lower spacer layer positioned between the lower structure and the encapsulated structure, wherein at least one of the upper spacer layer and the lower spacer layer is not formed of the second material of the encapsulating layer.

11. A device for filtering of incident radiation, comprising:
a first pixel and a second pixel, wherein the first pixel transmits a first passband of incident radiation centered around a first center wavelength and the second pixel transmits a second passband centered around a second center wavelength, wherein each of the first pixel and the second pixel includes:
an encapsulated layer; and
a highly reflective filtering structure including at least one of an upper structure positioned a first distance above the encapsulated layer and a lower structure positioned a second distance below the encapsulated layer, wherein the highly reflective filtering structure is characterized by a stopband; and
wherein the first pixel includes a first array of micro-resonant elements arranged spatially distinct from each other in a plane of the encapsulated layer, wherein each micro-resonant element is formed of a first material of the first array having a first index of refraction, and the first array of micro-resonant elements is encapsulated within a second material of the encapsulating layer having a second index of refraction, wherein the first index of refraction is higher than the second index of refraction;
wherein the second pixel includes a second array of micro-resonant elements arranged spatially distinct from each other in the plane of the encapsulated layer, wherein each micro-resonant element of the second pixel is formed of a third material having a third index of refraction that is higher than second index of refraction, wherein the second array of micro-resonant elements is also encapsulated within the second material of the encapsulated layer; and
wherein the first array of micro-resonant elements of the first pixel is configured to transmit the first passband of incident radiation centered around the first center wavelength, and the second array of micro-resonant elements of the second pixel is configured to transmit the second passband of incident radiation centered around the second center wavelength wherein each of the first center wavelength and the second center wavelength falls within the stopband of the highly reflective filtering structure, and each of the first array and the second array are configured to minimize a dependence of the first center wavelength and of the second center wavelength, respectively, on an angle of incidence of the incident radiation.

12. The device of claim 11, wherein the first index of refraction of the first material of the micro-resonant elements of the first array is the same as the third index of refraction of the third material of the micro-resonant elements of the second array.

13. The device of claim 11,
wherein a first size of each of the micro-resonant elements along an axis of the first array is less than the first center wavelength, and wherein each of the micro-resonant elements in the first array is configured with the first size and a first shape and a first periodicity on the first array to support a mode of each of the micro-resonant elements of the first array at the first center wavelength, the first size and the first shape and the first periodicity configured to transmit the first passband of incident radiation centered around the first center wavelength; and wherein a second size of each of the micro-resonant elements along an axis of the second array is less than the second center wavelength, and wherein each of the micro-resonant elements in the second array is configured with the second size and a second shape and a second periodicity on the second array to support a mode of each of the micro-resonant elements of the second array at the second center wavelength, the second size and the second shape and the second periodicity configured to transmit the second passband of incident radiation centered around the second center wavelength, and wherein the second passband around the second center wavelength is distinct from the first passband around the first center wavelength.

14. The device of claim 13, wherein each of the first periodicity of the first array of micro-resonant elements along the axis of the first array, and the second periodicity of the second array of micro-resonant elements along the axis of the first array is configured to minimize the dependence of the first center wavelength and the second center wavelength, respectively, on the angle of incidence.

15. The device of claim 13, wherein the second size of each of the micro-resonant elements of the second array is smaller than the first size of each of the micro-resonant elements of the first array, and wherein the second center wavelength of the second passband is shorter than the first center wavelength.

16. The device of claim 13, wherein a type of each of the first array and the second array of micro-resonant elements is one of a rectangular, square, centered rectangular, oblique, and hexagonal array.

17. The device of claim 13, wherein the first shape and the second shape are one of a rectangular, square, hexagonal, pentagonal, triangular, circular, semi-circular, elliptical, and an L shape.

18. The device of claim 13, wherein a type of each of the first array and the second array, together with the first size, the first shape and the first periodicity, and the second size, the second shape and the second periodicity, respectively, is configured to support the mode of each of the micro-resonant elements of the first array at the first center wavelength and of the second array at the second center wavelength, respectively.

19. The device of claim 11, wherein the first center wavelength of the first passband and the second center wavelength of the second passband are determined at least in part by at least one of the first distance and the second distance of the highly reflective filtering structure from the encapsulated layer.

20. The device of claim 11, wherein the highly reflective filtering structure includes both the upper structure and the lower structure.

21. The device of claim 20, wherein at least one of the upper structure and the lower structure is a distributed bragg reflector (DBR) structure formed of pairs of alternating layers of high-refractive index and low-refractive index layers.

22. The device of claim 20, wherein the second material of the encapsulated material extends across the second distance below the encapsulated layer and across the first distance above the encapsulated layer, and wherein the first distance and the second distance of the encapsulated layer from the upper structure and the lower structure, respectively, are configured to minimize the dependence of the center wavelength on the angle of incidence.

23. The device of claim 20, further comprising an upper spacer layer positioned between the upper structure and the encapsulated layer and a lower spacer layer positioned between the lower structure and the encapsulated structure, wherein at least one of the upper spacer layer and the lower spacer layer is not formed of the second material of the encapsulating layer.

\* \* \* \* \*